United States Patent [19]
Kiyohara

[11] Patent Number: 6,061,470
[45] Date of Patent: *May 9, 2000

[54] FACSIMILE APPARATUS CAPABLE OF READING AN ORIGINAL HAVING A TWO-COLOR IMAGE

[75] Inventor: Takahiro Kiyohara, Machida, Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/629,874

[22] Filed: Apr. 10, 1996

[30] Foreign Application Priority Data

May 8, 1995 [JP] Japan ................................ 7-109520

[51] Int. Cl.[7] .............................. G06K 9/00; G06K 9/34
[52] U.S. Cl. ..................... 382/164; 382/165; 358/500; 358/501

[58] Field of Search ..................................... 382/164, 165, 382/162, 163; 358/500, 501, 401, 448, 468, 530, 515, 518

[56] References Cited

U.S. PATENT DOCUMENTS

| | | | |
|---|---|---|---|
| 4,369,461 | 1/1983 | Tamura | 358/500 |
| 5,638,192 | 6/1997 | Yoshida | 358/530 |

*Primary Examiner*—Thomas D. Lee
*Attorney, Agent, or Firm*—Fitzpatrick, Cella, Harper & Scinto

[57] ABSTRACT

A facsimile apparatus includes a reading unit for reading an original, a discrimination unit for discriminating red images in the image representation provided by the reading unit, a conversion unit for converting, into black images, images discriminated as red images by the discrimination unit in the image representation, and for converting black images into images having a predetermined repeating pattern which look gray, and a transmission unit for performing fascimile transmission of the images converted by the conversion unit.

44 Claims, 29 Drawing Sheets

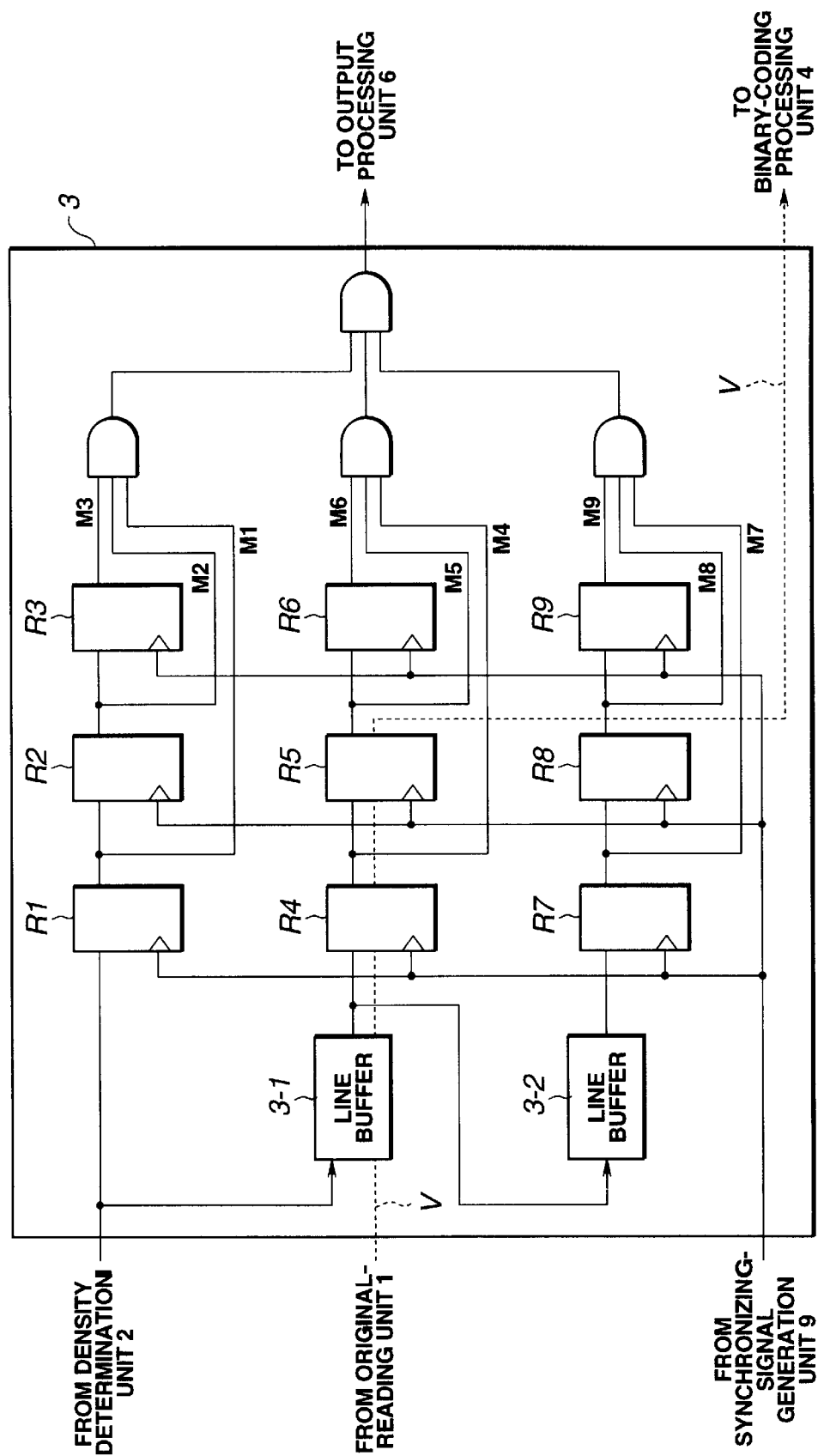

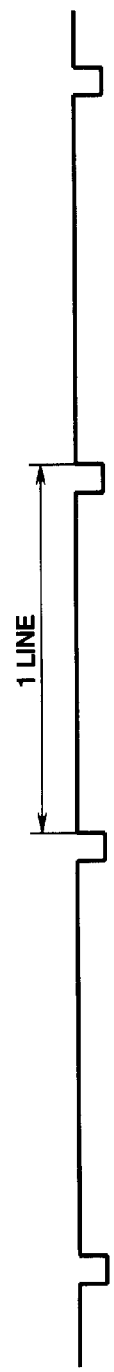
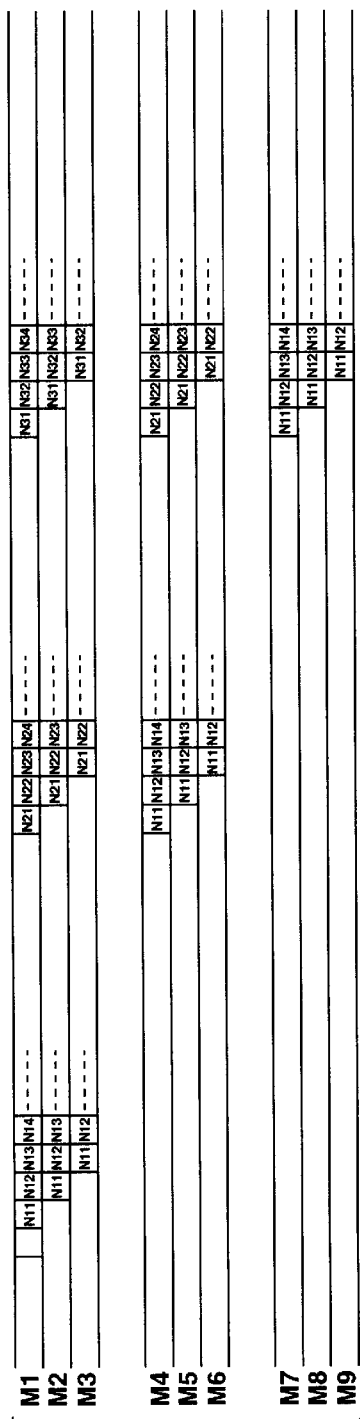
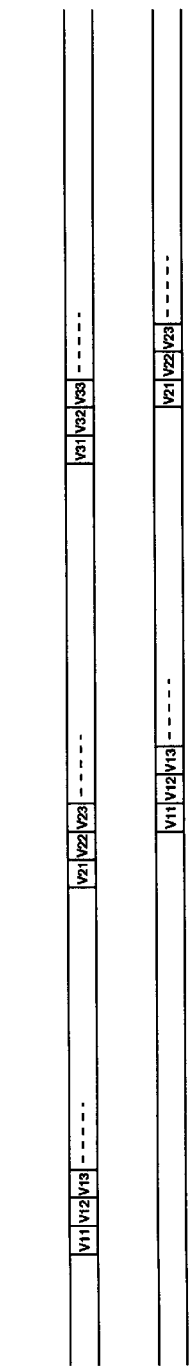
FIG.6(1) IMAGE TRANSFER CLOCK SIGNAL CLK
FIG.6(2) LINE SYNCHRONIZING SIGNAL S
FIG.6(3) RESULT OF DENSITY DETERMINATION N
FIG.6(4) OUTPUTS OF R1~R9
FIG.6(5) MULTIVALUE IMAGE DATA V
FIG.6(6) MULTIVALUE IMAGE DATA V OUTPUT FROM FILTERING PROCESSING UNIT 3

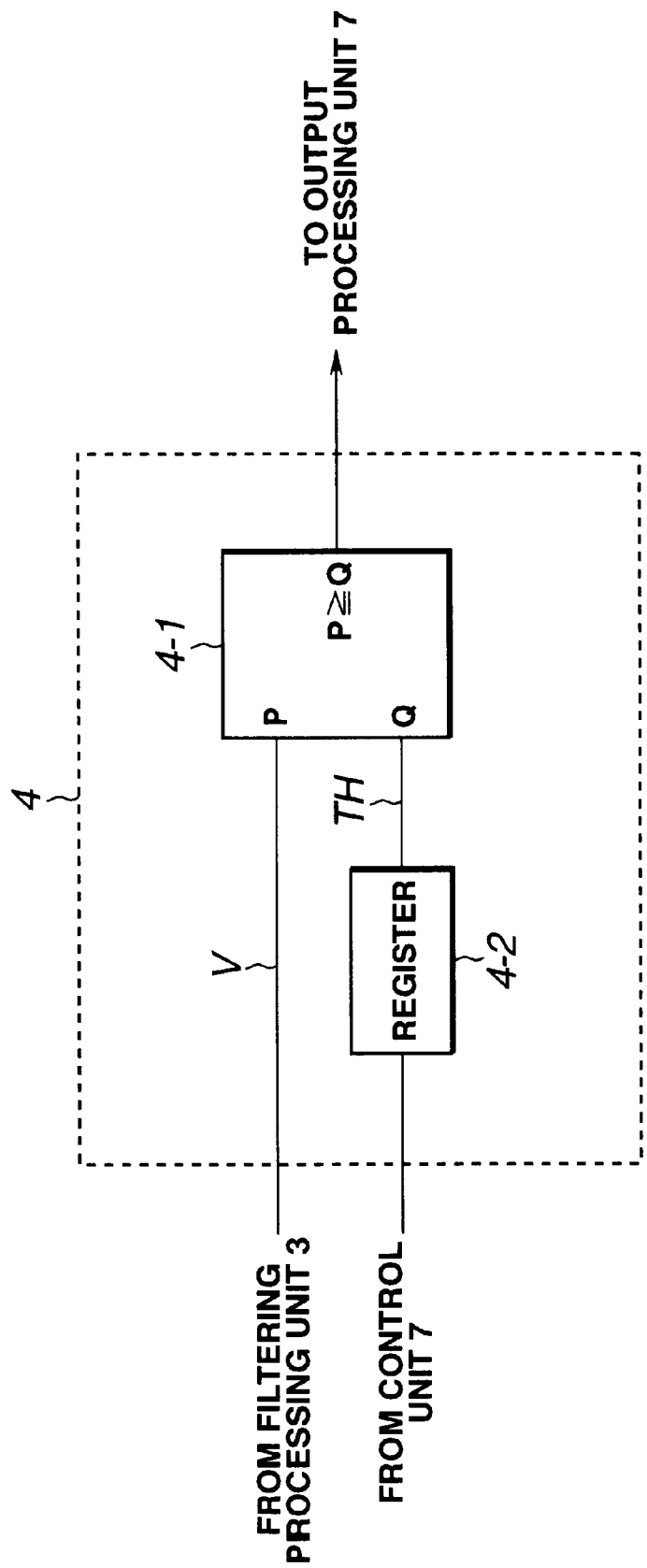

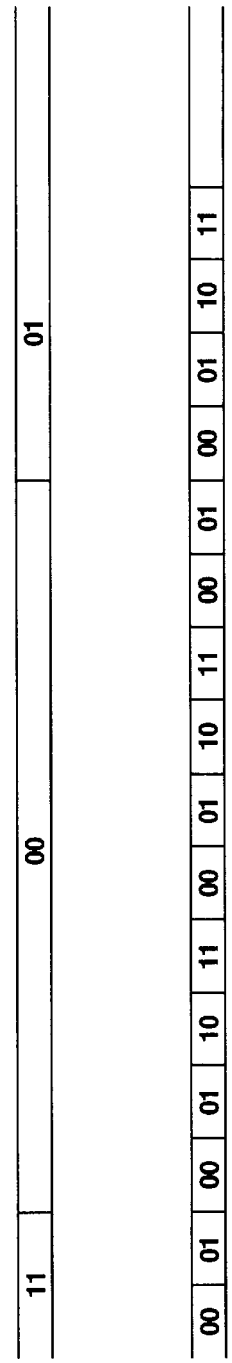
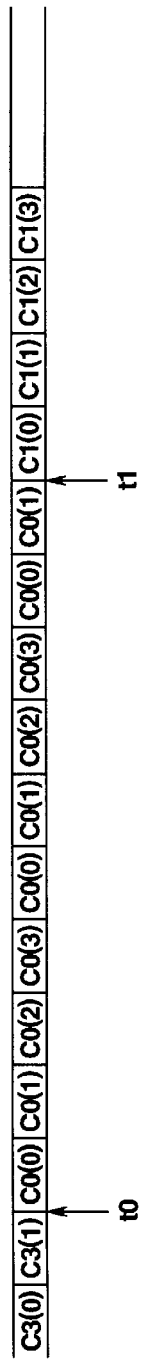
FIG.9(1) CLOCK SIGNAL CLK
FIG.9(2) LINE SYNCHRONIZING SIGNAL S
FIG.9(3) COUNTER 5-2
FIG.9(4) COUNTER 5-1
FIG.9(5) ROM 5-3

FIG.10

|  | | A1 A0 | | | |
|---|---|---|---|---|---|
|  | | 00 | 01 | 10 | 11 |
| A3 A2 | 00 | C0 (0) | C0 (1) | C0 (2) | C0 (3) |
|  | 01 | C1 (0) | C1 (1) | C1 (2) | C1 (3) |
|  | 10 | C2 (0) | C2 (1) | C2 (2) | C2 (3) |
|  | 11 | C3 (0) | C3 (1) | C3 (2) | C3 (3) |

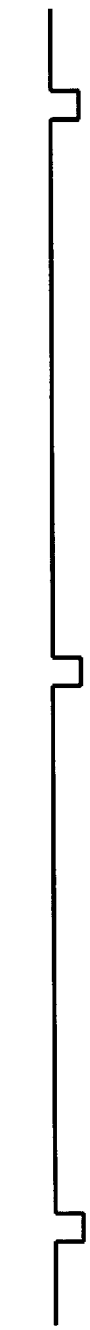
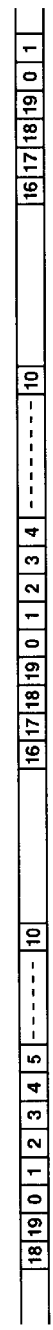
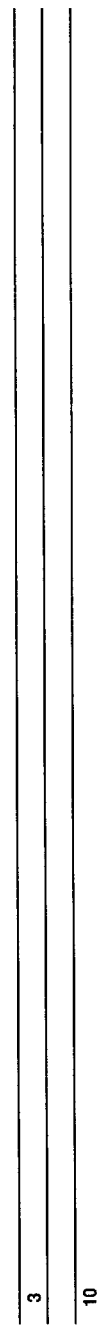
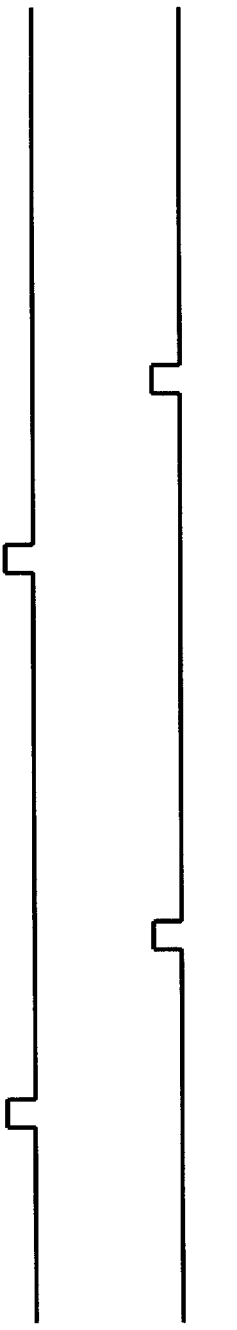
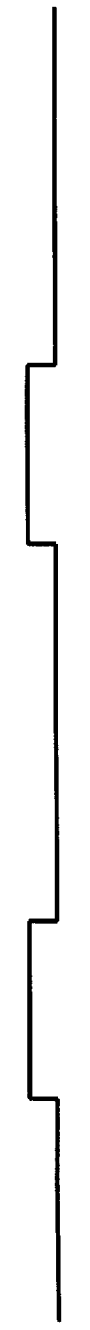
FIG.16(1) IMAGE CLOCK SIGNAL CLK
FIG.16(2) LINE SYNCHRONIZING SIGNAL RS
FIG.16(3) OUTPUT VALUE OF COUNTER 11-1
FIG.16(4) SET VALUE OF REGISTER 11-2
FIG.16(5) SET VALUE OF REGISTER 11-3
FIG.16(6) OUTPUT OF COMPARATOR 11-4
FIG.16(7) OUTPUT OF COMPARATOR 11-5
FIG.16(8) OUTPUT OF J-K FLIP-FLOP CIRCUIT 11-6

FIG.18(1) IMAGE CLOCK SIGNAL CLK

FIG.18(2) LINE SYNCHRONIZING SIGNAL RS

FIG.18(3) OUTPUT OF FILTERING PROCESSING UNIT 3

FIG.18(4) OUTPUT OF DETERMINATION-REGION SETTING UNIT 11

FIG.18(5) OUTPUT OF COUNTER 12-1 RCD

FIG.18(6) OUTPUT OF D FLIP-FLOP CIRCUIT 12-2

MARKER

FACSIMILE APPARATUS CAPABLE OF READING AN ORIGINAL HAVING A TWO-COLOR IMAGE

BACKGROUND OF THE INVENTION

1. Field of the Invention

This invention relates to a facsimile apparatus capable of reading an original having a two-color image.

2. Description of the Related Art

In ordinary facsimile apparatuses, a read image of an original is subjected to binary-coding processing. If the value of the threshold for this binary-coding processing is not appropriately set, marker portions provided using a fluorescent or felt-tip pen or color portions provided using a sign or ballpoint pen, for example, cannot be transmitted as images because the density value of these portions is lower than the density value of black characters. On the other hand, if such marker portions are superposed on characters and transmitted as images, the transmitted images will look like images obtained by painting portions over black characters with a black pen, and therefore the operator at the reception side cannot read the characters. For example, if a teacher transmits a pupil's examination paper corrected with a red pen through a facsimile apparatus, the characters written with the red pen will be converted into black characters at the reception side. Accordingly, it may be difficult for the pupil to identify which characters were written with the red pen, and therefore the characters written by the teacher may make only a weak impression.

SUMMARY OF THE INVENTION

It is an object of the present invention to provide a facsimile apparatus which solves the above-described problems.

It is another object of the present invention to provide a facsimile apparatus which can transmit an image of an original by emphasizing color characters and reducing the density of black characters.

It is still another object of the present invention to provide a facsimile apparatus which is useful for communicating corrected examination papers.

According to one aspect, the present invention which achieves these objectives relates to a facsimile apparatus comprising reading means for reading an image of an original, discrimination means for discriminating color images in the image read by the reading means, conversion means for converting images discriminated as color images by the discrimination means in the image read by the reading means into black images, and for converting other images into images having a predetermined repeating pattern, and transmission means for performing fascimile transmission of the images converted by the conversion means.

According to another aspect, the present invention which achieves these objectives relates to a facsimile transmission method comprising the steps of reading an image of an original, discriminating color images in the read image, converting images discriminated as color images in the discriminating step in the read image into black images and converting other images into images having a predetermined repeating pattern, and performing facsimile transmission of the images converted in the converting step.

According to still another aspect, the present invention which achieves these objectives relates to a facsimile apparatus comprising reading meand for reading an image of an original, discrimination means for discriminating images having a specific color in the image read by the reading means, conversion means for converting images discriminated as images having the specific color by the discrimination means in the image read by the reading means into black images and for converting other images into images having a predetermined repeating pattern, and transmission means for performing fascimile transmission of the images converted by the conversion means.

According to yet another aspect, the present invention which achieves these objectives relates to a facsimile transmission method comprising the steps of reading an image of an original, discriminating images having a specific color in the read image, converting images discriminated as images having the specific color in the discriminating step into black images and converting other images into images having a predetermined repeating pattern, and performing facsimile transmission of the images converted in the converting step.

The foregoing and other objects, advantages and features of the present invention will become more apparent from the following description of the preferred embodiments taken in conjunction with the accompanying drawings.

BRIEF DESCRIPTION OF THE DRAWINGS

FIG. 5 is a block diagram illustrating an example of the configuration of a filtering processing unit shown in FIG. 1;

FIGS. 6(1) through 6(6) are timing charts illustrating operations of the filtering processing unit;

FIG. 7 is a block diagram illustrating the configuration of circuitry of a binary-coding processing unit shown in FIG. 1;

FIGS. 9(1) through 9(5) are timing charts illustrating operations of the periodic-pattern generation unit;

FIG. 10 is a diagram illustrating a periodic pattern;

FIGS. 16(1) through 16(8) are timing charts illustrating operations of the determination-region setting unit;

DESCRIPTION OF THE PREFERRED EMBODIMENTS

First Embodiment

Figure 1:
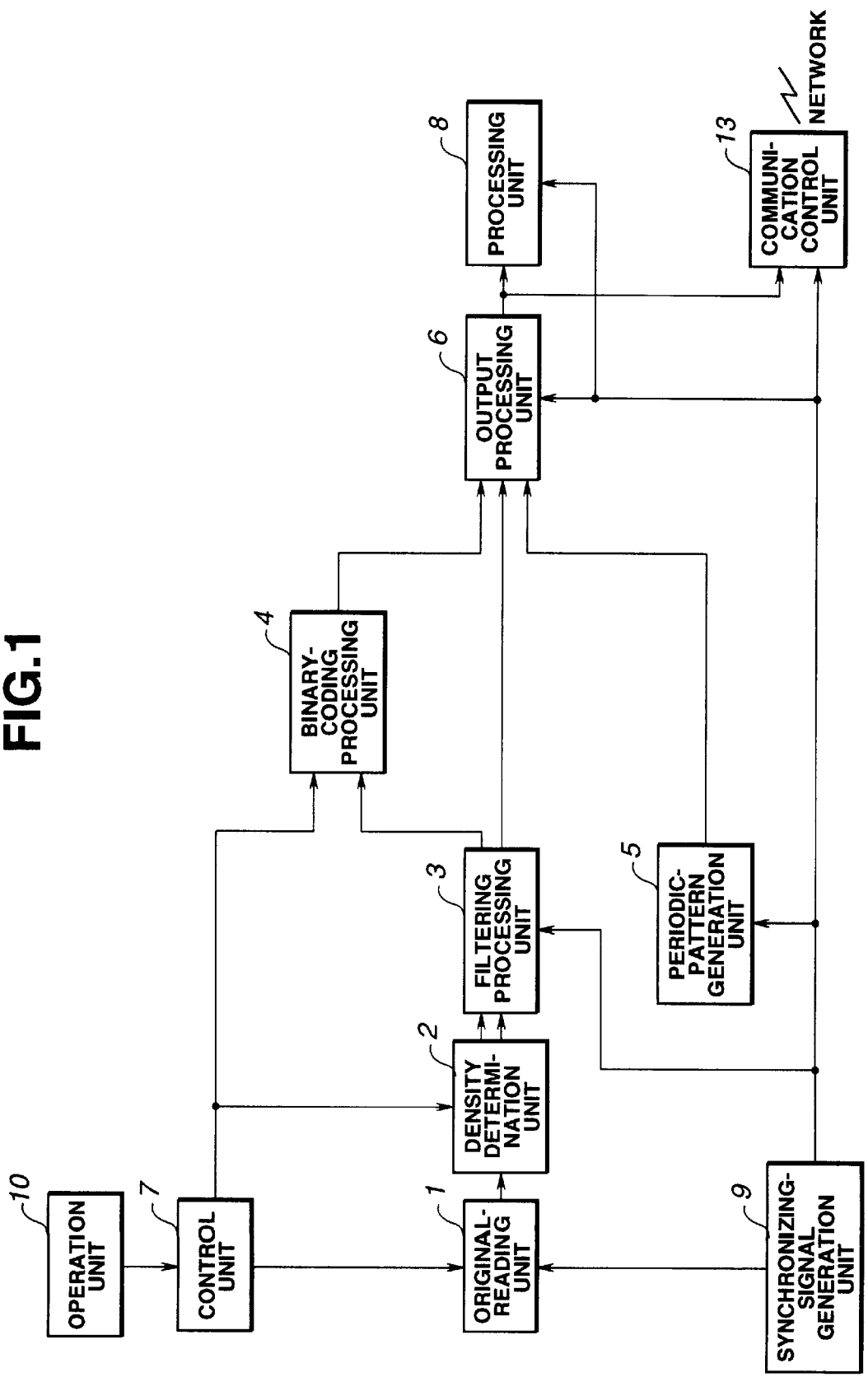
FIG. 1 is a block diagram illustrating the configuration of a facsimile apparatus according to a first embodiment of the present invention.

FIG. 1 is a block diagram illustrating the configuration of a facsimile apparatus according to a first embodiment of the present invention. In FIG. 1, an original-reading unit 1 reads an original having at least one information element (e.g. character), and outputs multivalue data corresponding to read density values, i.e., an image representation of the original including at least one image, each image corresponding to a respective information element. A density determination unit 2 determines the density of the multivalue image data output from the original-reading unit 1. A filtering processing unit 3 performs filtering processing for the result of the determination of density. A binary-coding processing unit 4 performs binary-coding processing of the multivalue image data. A periodic-pattern generation unit 5 generates a periodic pattern. An output processing unit 6 selects one of the output of the binary-coding processing unit 4 and the output of the periodic-pattern generation unit 5 based on the output of the filtering processing unit 3, and outputs the selected signal. A control unit 7 controls the operation of the apparatus. A recording unit 8 records the output of the output processing unit 6 on paper or the like. A synchronizing-signal generation unit 9 generates a synchronizing signal. Reference numeral 10 represents an operation unit of the apparatus, and reference numeral 13 represents a communication control unit.

Figure 2:
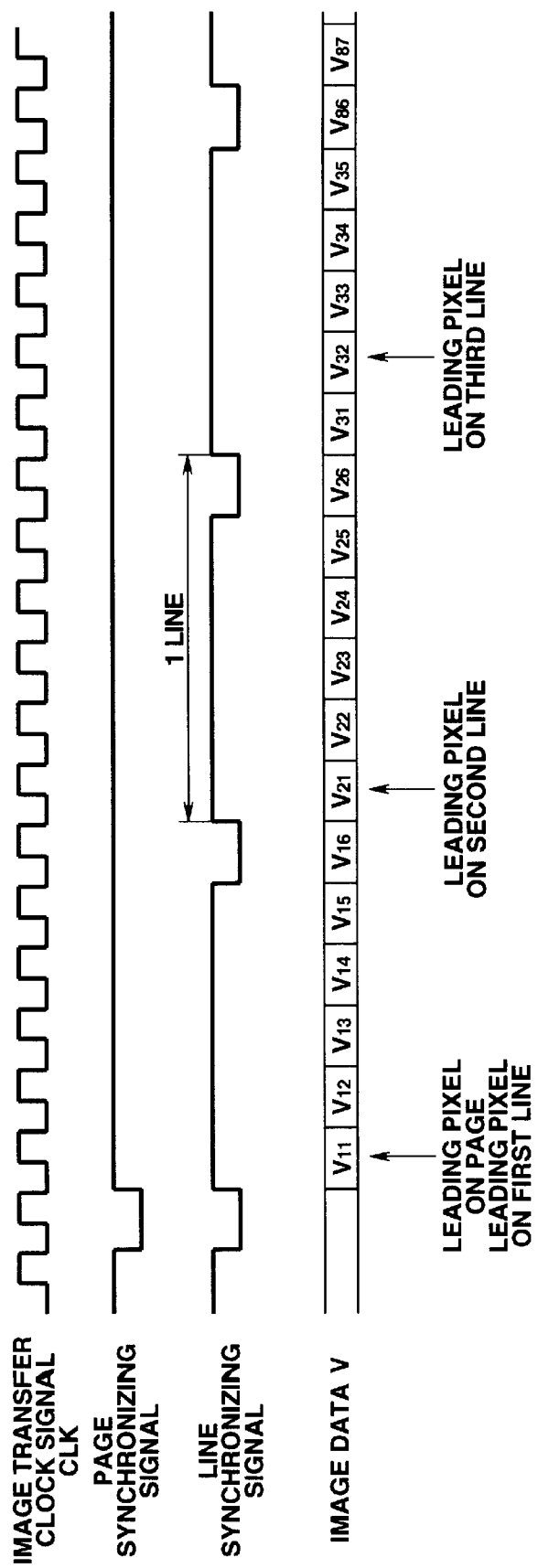
FIG. 2 illustrates timing charts illustrating the relationship between synchronizing signals and image data.

FIG. 2 illustrates timing charts illustrating the relationship among an image clock signal, a line synchronizing signal, a page synchronizing signal and image data. Image data V is transferred in synchronization with the image clock signal. The page synchronizing signal indicates the leading pixel of an original. The rise of this signal corresponds to the start of the first line of the read original. The line synchronizing signal indicates the leading pixel of each line. The rise of this signal corresponds to the start of the line.

Figure 3:
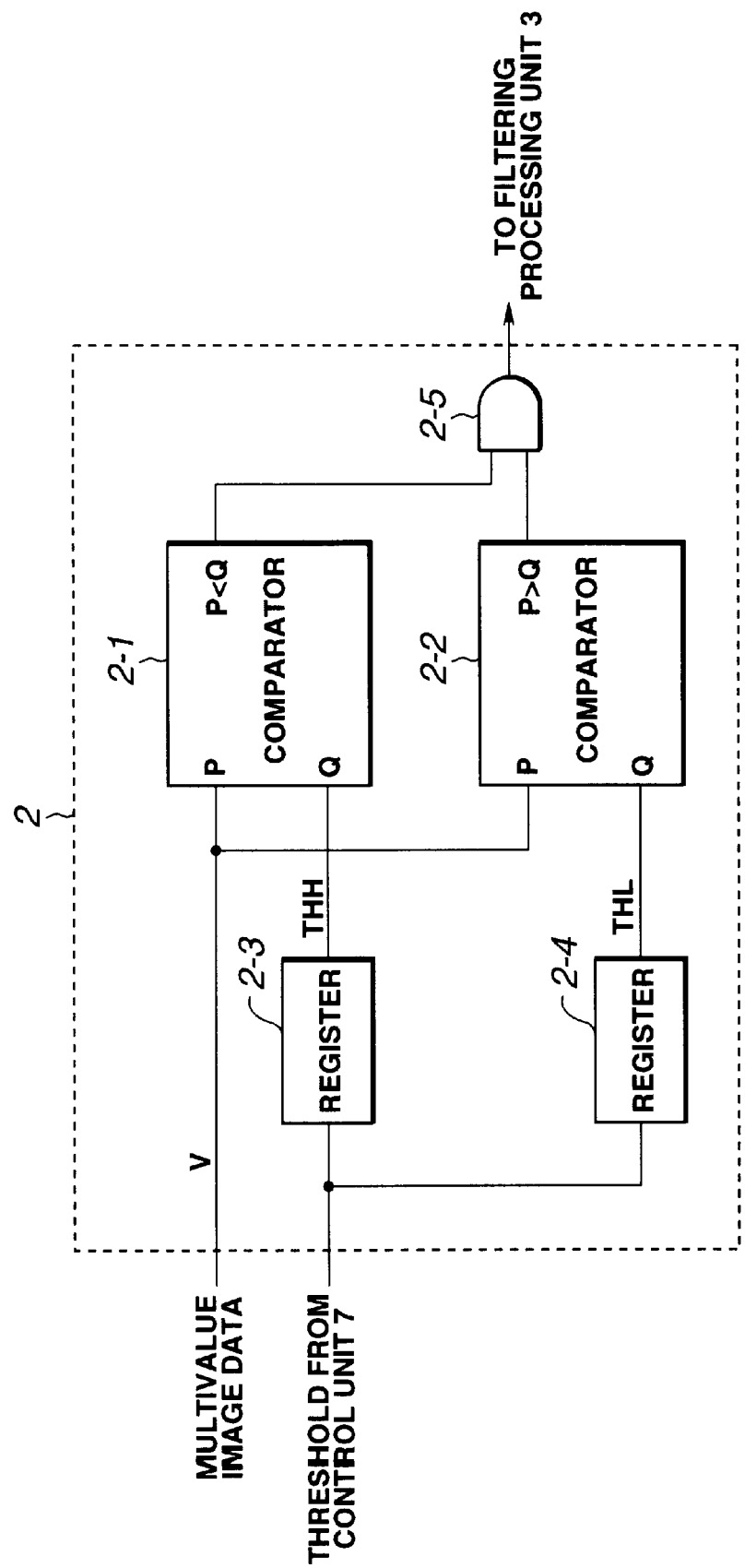
FIG. 3 is a block diagram illustrating the configuration of a density determination unit shown in FIG. 1.

FIG. 3 is a block diagram illustrating an example of the configuration of the density determination unit 2. In FIG. 3, there are shown comparators 2-1 and 2-2 that receive the multivalue image data V transmitted from the original-reading unit 1. The control unit 7 sets the density threshold values THH and THL (THH>THL). The comparator 2-1 outputs 1 when THH>V, and the comparator 2-2 outputs 1 when THL<V. That is, the density determination unit outputs 1 when THL<V<THH.

Figure 4:
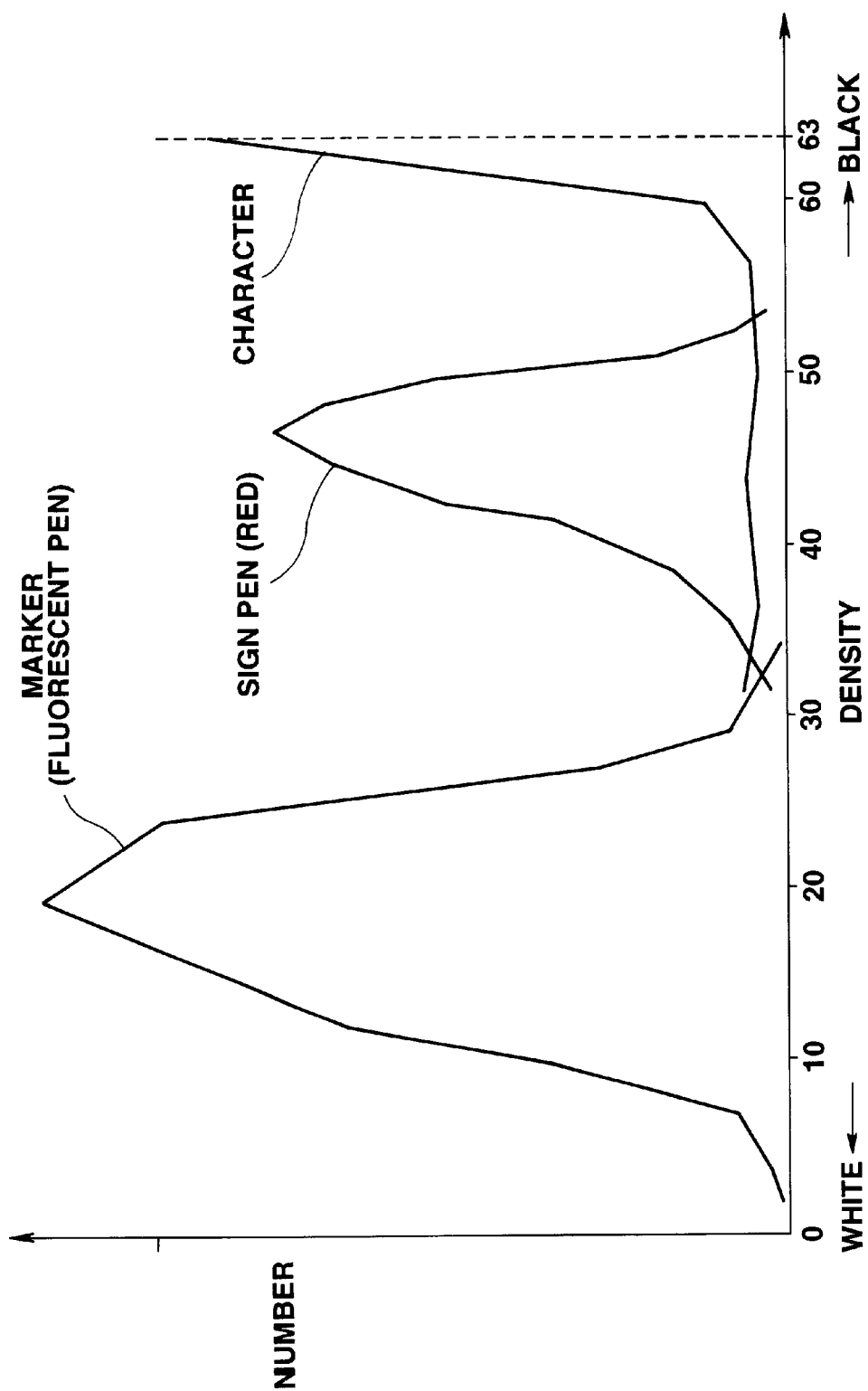
FIG. 4 is a graph illustrating density histograms of a portion provided using a sign pen, a portion provided using a fluorescent pen, and a character portion.

FIG. 4 is a graph illustrating density histograms of a portion provided using a sign pen (red), a portion provided using a marker pen (fluorescent pen), and a character portion. In FIG. 4, the abscissa represents the value of the multivalue image data when one pixel comprises 6 bits (0–63), and the ordinate represents the number of pixels within a constant area. It is clear from FIG. 4 that the numbers of pixels are largest in the vicinity of the density values 40–50, 20, and 62 and 63 for the sign-pen portion, the fluorescent-pen portion, and the character portion, respectively. This indicates that character portions and marker portions can be separated from each other according to their density values. For example, in order to make the density determination unit 2 output 1 for a fluorescent-pen portion, the thresholds are set so that THL=7 and THH=30. In order to make the density determination unit 2 output 1 for a sign-pen portion, the thresholds are set so that THL=33 and THH=52.

FIG. 5 illustrates an example of the configuration of the filtering processing unit 3 when providing a pixel matrix comprising 3×3 pixels. In FIG. 5, each of the line buffers LB1 and LB2 can store image data for one line. Each of the registers R1–R9 stores a 3×3 pixel matrix pattern. The operations of the filtering processing unit 3 will now be described with reference to FIGS. 6(1)–6(6). FIG. 6(1) illustrates an image transfer clock signal CLK. FIG. 6(2) illustrates a line synchronizing signal S. FIG. 6(3) illustrates the result of the determination of density N output from the density determination unit 2. FIG. 6(4) illustrates the outputs M1–M9 of the registers R1–R9, respectively. FIG. 6(5) illustrates the multivalue image data V output from the original-reading unit 1. FIG. 6(6) illustrates the multivalue image data V output from the filtering processing unit 3. The result of determination of density N is serially transferred in synchronization with the image transfer clock signal CLK, and is input to the register R1 and the line buffer LB1. The image data V is input to the line buffer LB1 in synchronization with the image transfer clock signal CLK. The result of the determination of density N output from the line buffer LB1 in synchronization with the image transfer clock signal CLK is input to the register R4 and the line buffer LB2. The image data V and the result of the determination of density N are output from the line buffer LB1 while being delayed by one line, and the result of the determination of density N is output from the line buffer LB2 while being delayed by two lines. Image data and the result of the determination of density input to the registers R1, R4 and R7 in synchronization with the transfer of the image data V, and image data and the result of the determination of density input to the registers R2, R5 and R8 are sequentially shifted to the registers R2, R5 and R8, and to the registers R3, R6 and R9, respectively, to provide a pixel matrix comprising 3×3 pixels. In FIG. 5, broken lines indicate image data VD, and solid lines indicate the result of the determination of density.

As shown in the example of circuitry of FIG. 5, the filtering processing unit 3 outputs 1 and 0 when all of the registers M1–M9 assume 1 and when at least one of the registers M1–M9 assumes 0, respectively. According to this filtering processing, an erroneous determination by the density determination unit 2 for edge portions of characters or figures having intermediate density values and fluorescent-pen portions is prevented.

FIG. 7 illustrates an example of circuitry of the binary-coding processing unit 4. In FIG. 4, a simple binary-coding processing circuit is used. A comparator 4-1 compares multivalue image data V with a binary-coding threshold TH. The control unit 7 sets the threshold TH in a register 4-2. The comparator 4-1 outputs 1 when VD≧TH. Although in the present embodiment, a case of simple binary-coding processing is shown, binary-coding processing according to intermediate processing using a dither or error diffusion method may also be adopted.

Figure 8:
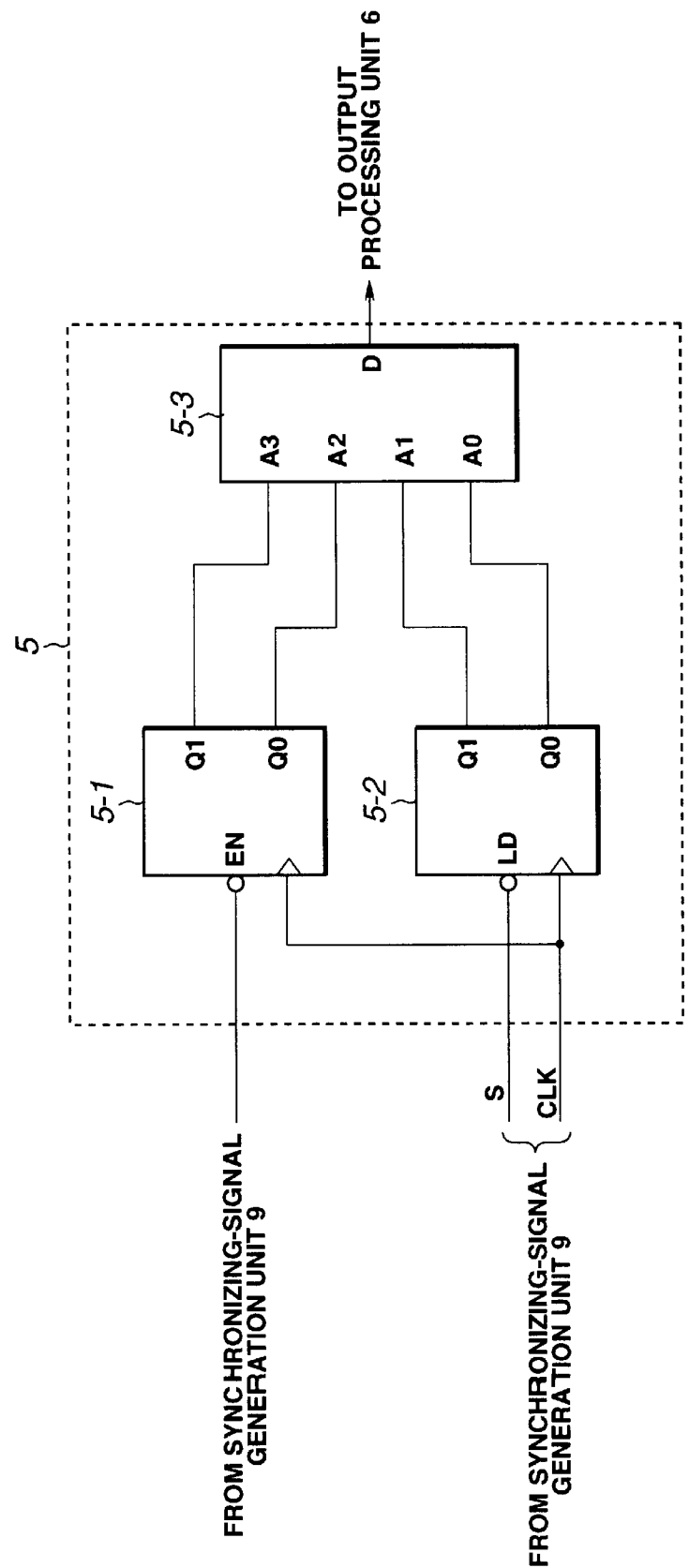
FIG. 8 is a block diagram illustrating an example of the configuration of a periodic-pattern generation unit shown in FIG. 1.

FIG. 8 is a block diagram illustrating an example of the configuration of the periodic-pattern generation unit 5. In FIG. 8, a first quarternary counter 5-1 performs a counting operation when a clock signal is input while the input to a terminal EN is 0. The counting operation is not performed when the input to the terminal EN assumes 1. When a clock signal is input to a second quaternary counter 5-2 while the input to a terminal LD assumes 0, an initial state is loaded, and outputs from terminals Q0 and Q1 assume 0. When a clock signal is input to the quaternary counter 5-2 while the input to the terminal LD assumes 1, a counting operation is performed. A ROM (read-only memory) 5-3, comprising 16×1 bits, stores patterns and provides an output D in accordance with inputs to addresses A1–A3. It is assumed that a pattern as shown in FIG. 10 is stored in the ROM 5-3. In FIG. 10, C0(0)–C3(3) represent 0 or 1 stored in the ROM 5-3. The operation of the periodic-pattern generation unit 5 will now be described with reference to the timing charts shown in FIGS. 9(1)–9(5). FIG. 9(1) illustrates a clock signal CLK. The periodic-pattern generation unit 5 operates in synchronization with the rise of this signal. FIG. 9(2) illustrates a line synchronizing signal S. The rise of this signal corresponds to the leading pixel of a line. FIG. 9(3) illustrates the outputs Q0 and Q1 of the counter 5-2 represented by binary numbers. FIG. 9(4) illustrates the outputs Q0 and Q1 of the counter 5-1 represented by binary numbers. FIG. 9(5) illustrates the output from the terminal D of the ROM 5-3, in which C0(0)–C3(3) are 0 or 1. If it is assumed that the outputs of the counter 5-1 at t0 are such that A2=A3=0, the ROM 5-3 outputs C0(0)–C0(3) from the terminal D in synchronization with the clock signal CLK. When the line synchronizing signal S becomes 0 and a clock signal enters (at time t1), the value of the counter 5-1 is incremented by one, and an initial state is loaded in the counter 5-2. Thus, A2=1 and A3=0, and the ROM 5-3 outputs C1(0)–C1(3) in synchronization with a clock signal. By repeating the above-described operation, a periodic pattern comprising 4×4 pixels is output from the ROM 5-3. This pattern can be freely set by a combination of C0(0–3)–C3(0–3). A pattern may be stored in advance in the ROM 5-3 as in this example, or the operator may freely set a pattern through the operation unit 10 by replacing the ROM 5-3 by a RAM (random access memory). A pattern in a larger range may be set by increasing the capacity of the ROM or RAM and increasing the number of bits of the counters 5-1 and 5-2.

Figure 11:
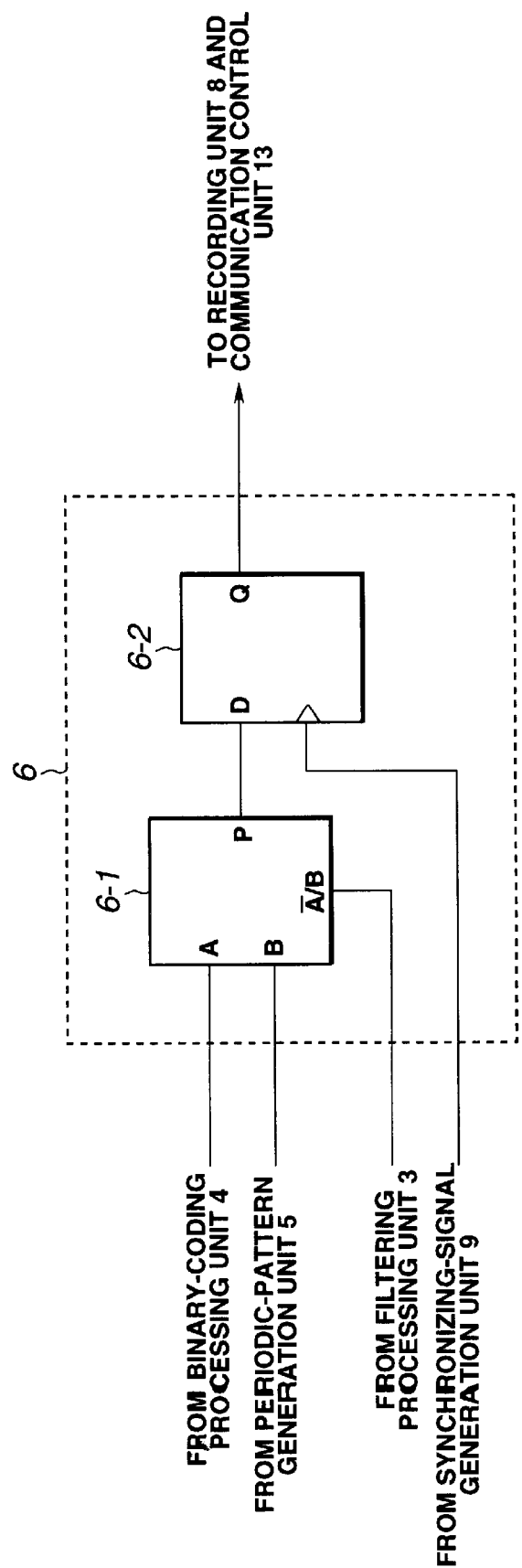
FIG. 11 is a block diagram illustrating the configuration of circuitry of an output processing unit shown in FIG. 1.

FIG. 11 is a block diagram illustrating an example of circuitry of the output processing unit 6. In FIG. 11, reference numeral 6-1 represents a selector, and reference numeral 6-2 represents a flip-clop circuit.

Next, the operations of the present embodiment will be described. Image data read by the original-reading unit 1 is, though not illustrated, subjected to shading correction, ABC (automatic brightness control) processing or the like, is then subjected to analog-to-digital conversion, and then is serially transferred to the density determination unit 2 and the filtering processing unit 3. The density determination unit 2 compares the transferred data V with the thresholds THH and THL set by the control unit 7, and outputs 1 to the filtering processing unit 3 only when THL<V<THH. The output V of the register R5 of the filtering processing unit 3 is subjected to binary-coding processing by the binary-coding processing unit 4 to provide binary image data. As described above, the periodic-pattern generation unit 5 generates a periodic pattern. The selector 6-1 of the output processing unit 6 selects one of the output of the binary-coding processing unit 4 and the output of the periodic-pattern generation unit 5 in accordance with the output of the filter processing unit 3. The D flip-flop circuit 6-2 transmits binary image data output from the selector 6-1 to the recording unit 8 in synchronization with the image clock signal.

The recording unit 8 records image data transmitted from the output processing unit 6 in accordance with the image clock signal. The communication control unit 13 transmits image data transmitted from the output processing unit 6 in accordance with the image clock signal.

Figure 22:
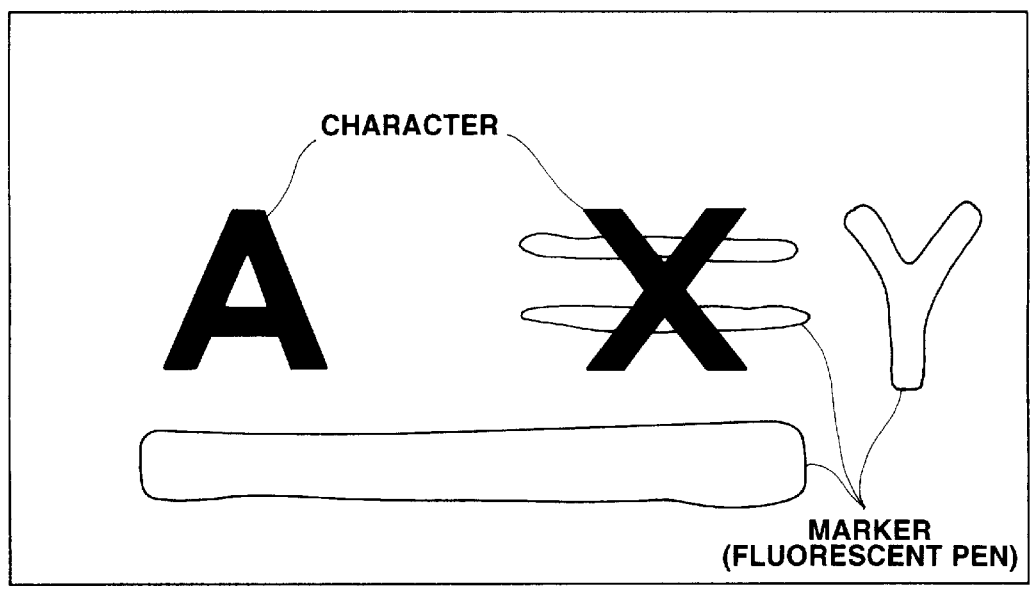
FIG. 22 is a diagram illustrating an image before processing in the first embodiment.
Figure 23:
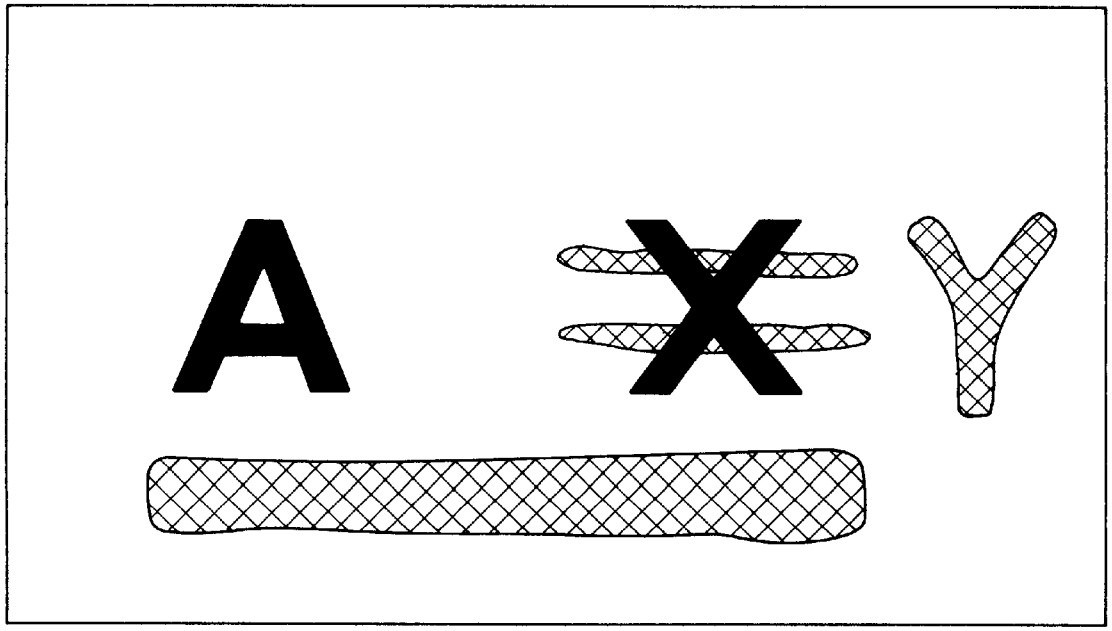
FIG. 23 is a diagram illustrating an image after processing in the first embodiment.

When an original shown in FIG. 22 is read in a state of THL=7 and THH=30, an output image representation becomes as shown in FIG. 23, in which images of the marker portions are output as images having a periodic pattern, and images of other portions are output as images subjected to binary-coding processing. Since a recording operation is performed in synchronization with an original-reading operation and an editing operation, an image can be edited and output in real time. If the thresholds are set such that THL=33 and THH=52, sign-pen portions are output as images having the periodic pattern.

In the present embodiment, a description has been provided of a case in which an image clock signal and a recording clock signal are the same. When a clock signal for the recording unit 8 is slower, a line buffer for adjusting speed may be provided between the output processing unit 6 and the recording unit 8 in order to absorb the difference in speed between a reading operation and a recording operation. In this case, an additional line buffer must be provided. However, since the capacity of the memory can be smaller than one page, the cost of the apparatus will not be greatly increased.

Also in the case of transmission, since an original-reading operation, an editing operation and a transmission operation can be simultaneously performed, a simple configuration can be realized in which, for example, a page image memory is unnecessary.

Second Embodiment

Figure 12:
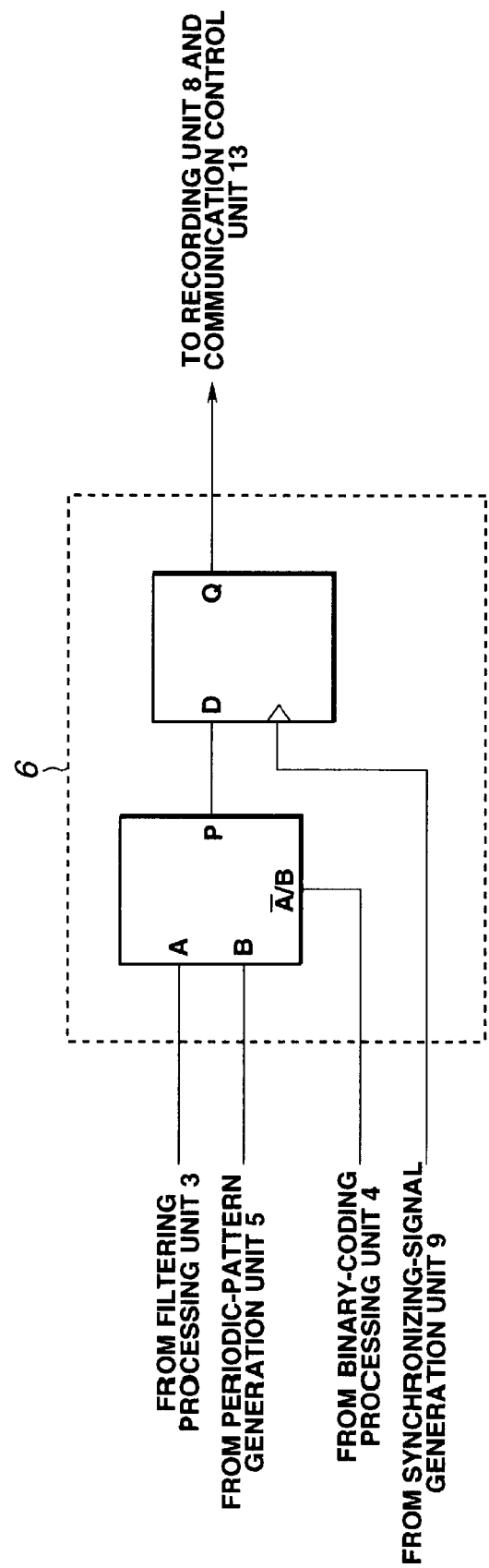
FIG. 12 is a block diagram illustrating the configuration of circuitry of an output processing unit according to a second embodiment of the present invention.
Figure 24:
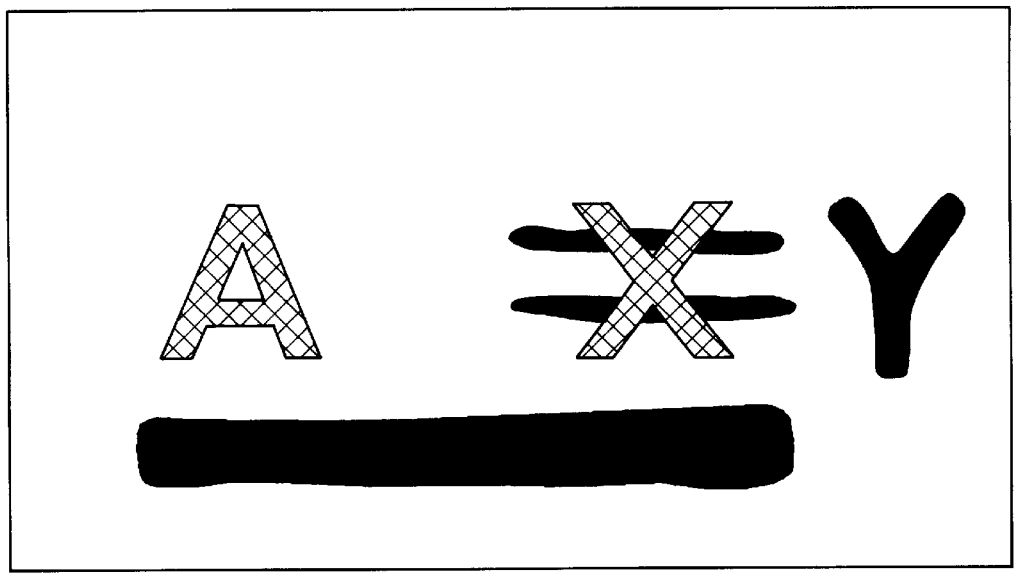
FIG. 24 is a diagram illustrating an image after processing in the second embodiment.

FIG. 12 illustrates an example of the configuration of the output processing unit 6 according to a second embodiment of the present invention. A description will now be provided only for the portions which differ from the first embodiment. In FIG. 12, a selector 6-1 selects one of the output of the filtering processing unit 3 and the output of the periodic-pattern generation unit 5 in accordance with the result of processing of the binary-coding processing unit 4, and outputs the selected signal. When the image of the original shown in FIG. 22 is processed in a state of THL=7 and THH=30, an image as shown in FIG. 24 is obtained. In FIG. 24, the marker portions are output as black images and the black-character portions are output as images having a periodic pattern. Since a recording operation or a transmission operation is performed in synchronization with an original-reading operation and an editing operation, an image can be edited and output in real time.

When the speed differs between the reading unit and the recording, a line buffer may be provided as described above.

If the thresholds are set such that THL=33 and THH=52 in the configuration of FIG. 12, the red-sign-pen portions are output as black images, and the black portions are output as images having a periodic pattern (for example, a pattern which looks gray). Such processing is effective, for example, when a pupil performs facsimile transmission of an examination paper to a teacher, and the teacher performs facsimile transmission of the examination paper corrected by him with a red pen back to the pupil. According to such processing, even if the apparatus at the facsimile reception side (the pupil side) can perform only black-and-white recording, recording in which red-pen portions attract attention is performed. Indeed, no problem arises even if black-character portions are recorded in a thin-line format because the pupil keeps the original of those portions.

The output processing unit 6 may have both the circuits shown in FIGS. 11 and 12 and select one of the circuits in accordance with an instruction from the operation unit 10, or the apparatus may select the circuit shown in FIG. 12 when a corrected-paper transmission mode has been assigned through the operation unit 10, and the control unit 7 may perform control so as to set THL=33 and THH=52.

By providing a plurality of each respective units shown in FIGS. 11 and 12, individual processing for each of a plurality of colors can be performed.

Third Embodiment

Figure 13:
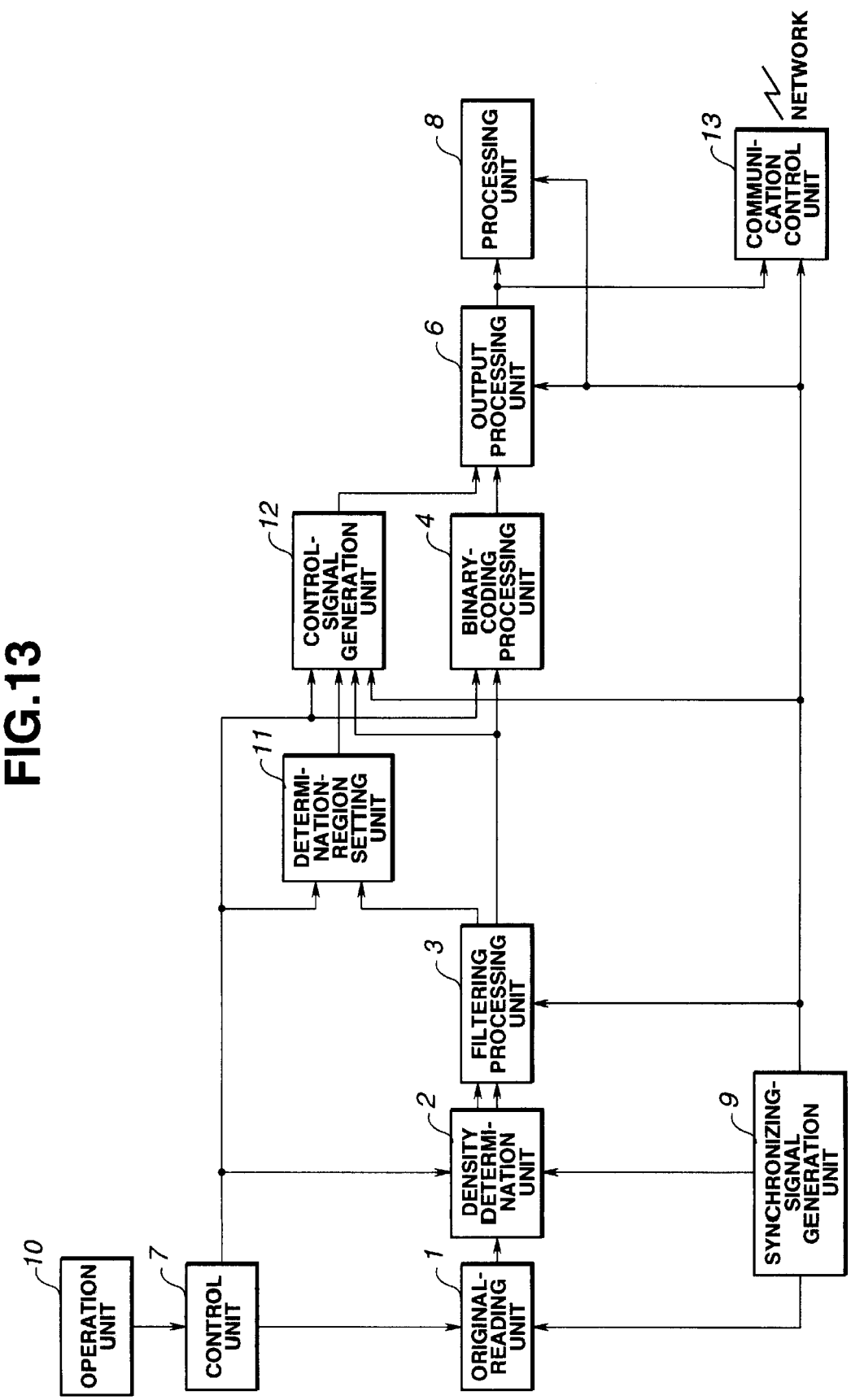
FIG. 13 is a block diagram illustrating the configuration of a facsimile apparatus according to a third embodiment of the present invention.

FIG. 13 is a block diagram illustrating the configuration of a facsimile apparatus according to a third embodiment of the present invention. In FIG. 13, reference numeral 11 represents a determination-region setting unit. A control-signal generation unit 12 generates a control signal for an output processing unit 6 in accordance with the output of a filtering processing unit 3.

Figure 14:
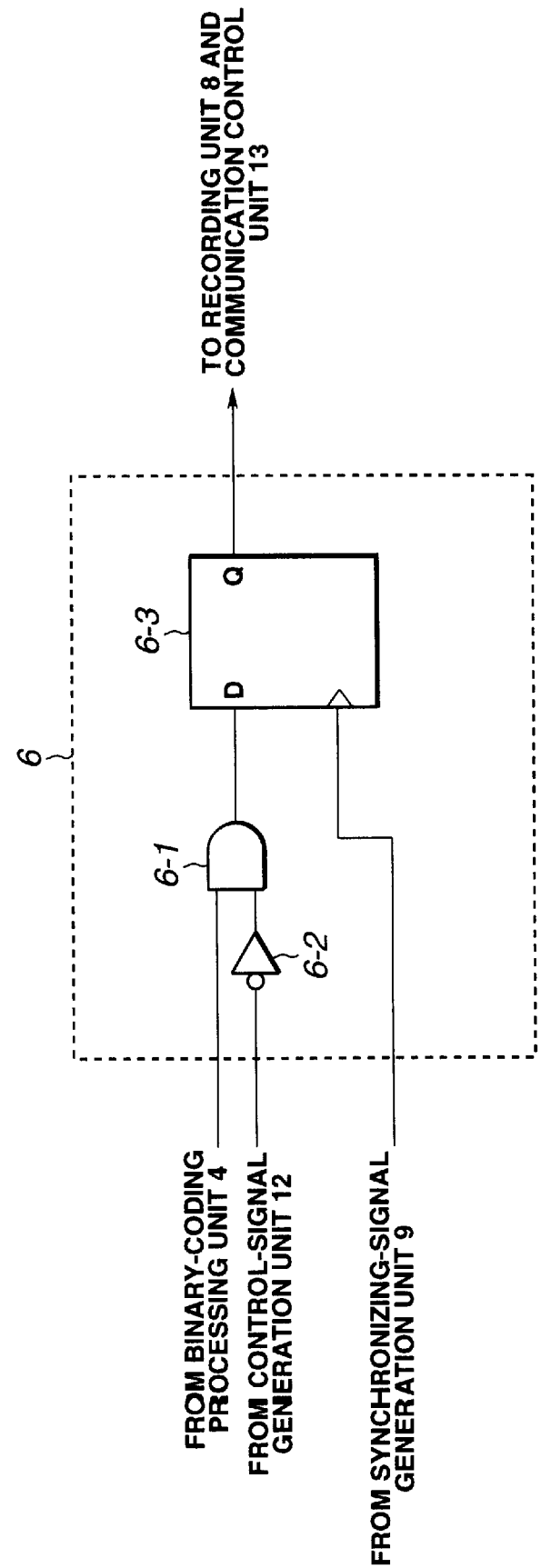
FIG. 14 is a block diagram illustrating the configuration of circuitry of an output processing unit shown in FIG. 13.

FIG. 14 illustrates the circuitry of the output processing unit 6. In FIG. 14, there are shown an AND gate 6-1, an inverter 6-2, and a D flip-flop circuit 6-3.

Figure 15:
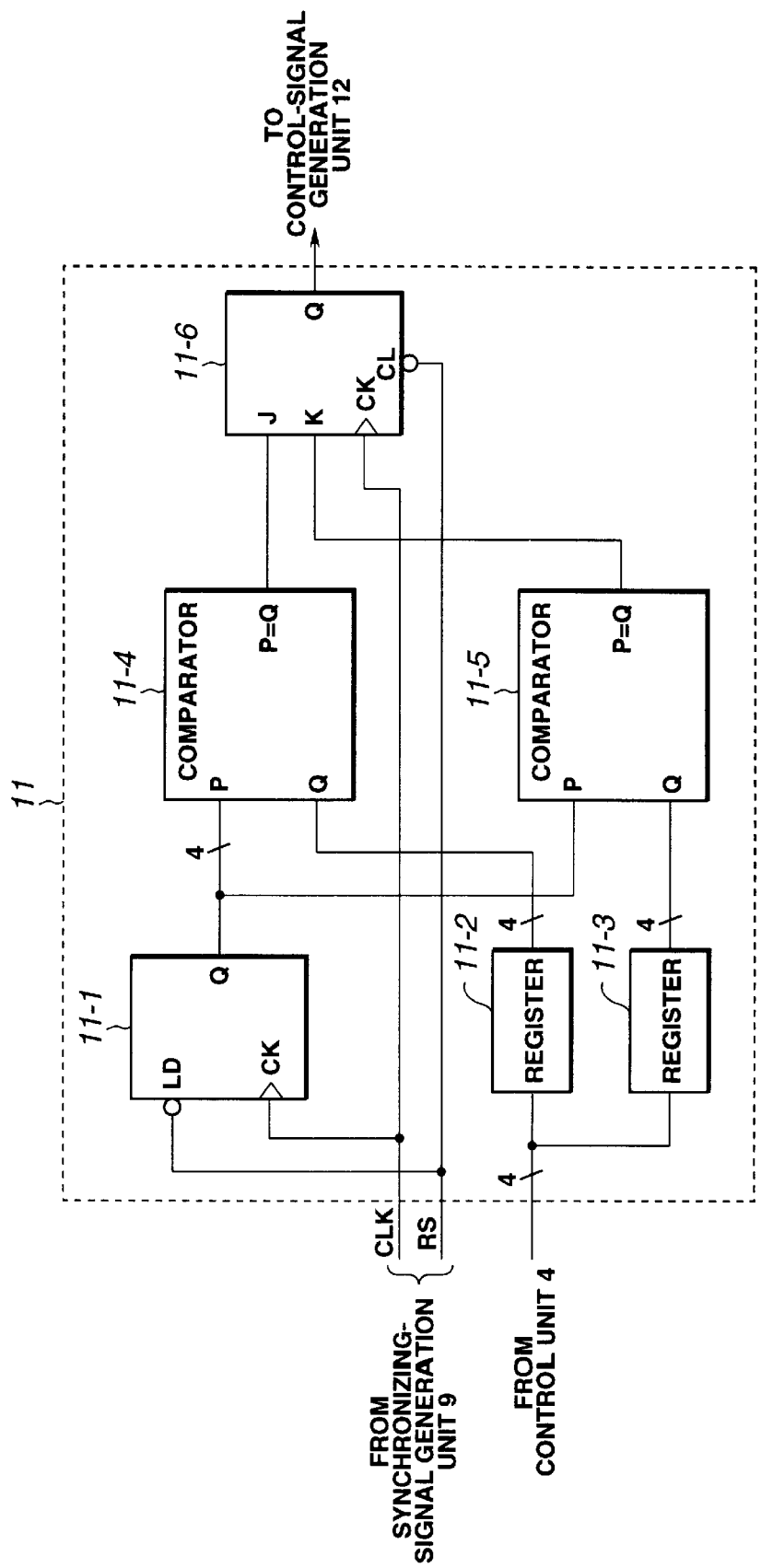
FIG. 15 is block diagram illustrating the configuration of circuitry of a determination-region setting unit shown in FIG. 13.

FIG. 15 is a block diagram illustrating the configuration of circuitry of the determination-region setting unit 11. By setting a determination region, an erroneous determination of marker portions written for purposes other than editing is prevented. Reference numeral 11-1 represents a counter. An initial value 0 is loaded in the counter 11-1 in synchronization with the rise of a clock signal when an input to a terminal LD assumes 0. There are also shown registers 11-2 and 11-3. Comparators 11-4 and 11-5 compare the output of the counter 11-1 with the outputs of the registers 11-2 and 11-3, respectively, and output 1 when the two values are equal. Reference numeral 11-6 represents a JK flip-flop circuit. The operations of the determination-region setting unit 11 will now be described with reference to the timing charts shown in FIGS. 16(1) through 16(8), where a case is shown in which the third pixel from the leading pixel of the line corresponds to the start of a determination region, and the tenth pixel corresponds to the end of the determination region. FIG. 16(1) illustrates an image clock signal CLK. FIG. 16(2) illustrates a line synchronizing signal RS. FIG. 16(3) illustrates the output value of the counter 11-1. FIG. 16(4) illustrates the set value of the register 11-2. FIG. 16(5) illustrates the set value of the register 11-3. FIG. 16(6) illustrates the output of the comparator 11-4. FIG. 16(7) illustrates the output of the comparator 11-5. FIG. 16(8) illustrates the output of the JK flip-flop circuit 11-6. The set values of the registers 11-2 and 11-3 correspond to the start and the end of the determination region, respectively. These values may be stored in an ROM or the like for each size of an original to be read, and for each position in each original. When the line synchronizing signal RS assumes 0, the output of the JK flip-flop circuit 11-6 also becomes 0, and an initial value 0 is set in the counter 11-1 in synchronization with the image clock signal CLK. When the line synchronizing signal RS assumes 1, a counting operation is performed in synchronization with the image clock signal CLK. When the output of the counter 11-1 shown in FIG. 16(3) equals the set value of the register 11-2 shown in FIG. 16(4), the output of the comparator 11-4 shown in FIG. 16(4) becomes 1, and the Q output of the JK flip-flop circuit 11-6 becomes 1 in synchronization with the image clock signal CLK. When the output of the counter 11-1 shown in FIG. 16(3) equals the set value of the register 11-3 shown in FIG. 16(5), the output of the comparator 11-5 shown in FIG. 16(7) becomes 1, and the Q output of the JK flip-flop circuit 11-6 shown in FIG. 16(8) becomes 0 in synchronization with the image clock signal CLK. An interval in which the Q output of the JK flip-flop circuit 11-6 shown in FIG. 16(8) assumes 1 is the range for determining the presence/absence of a marker.

Figure 17:
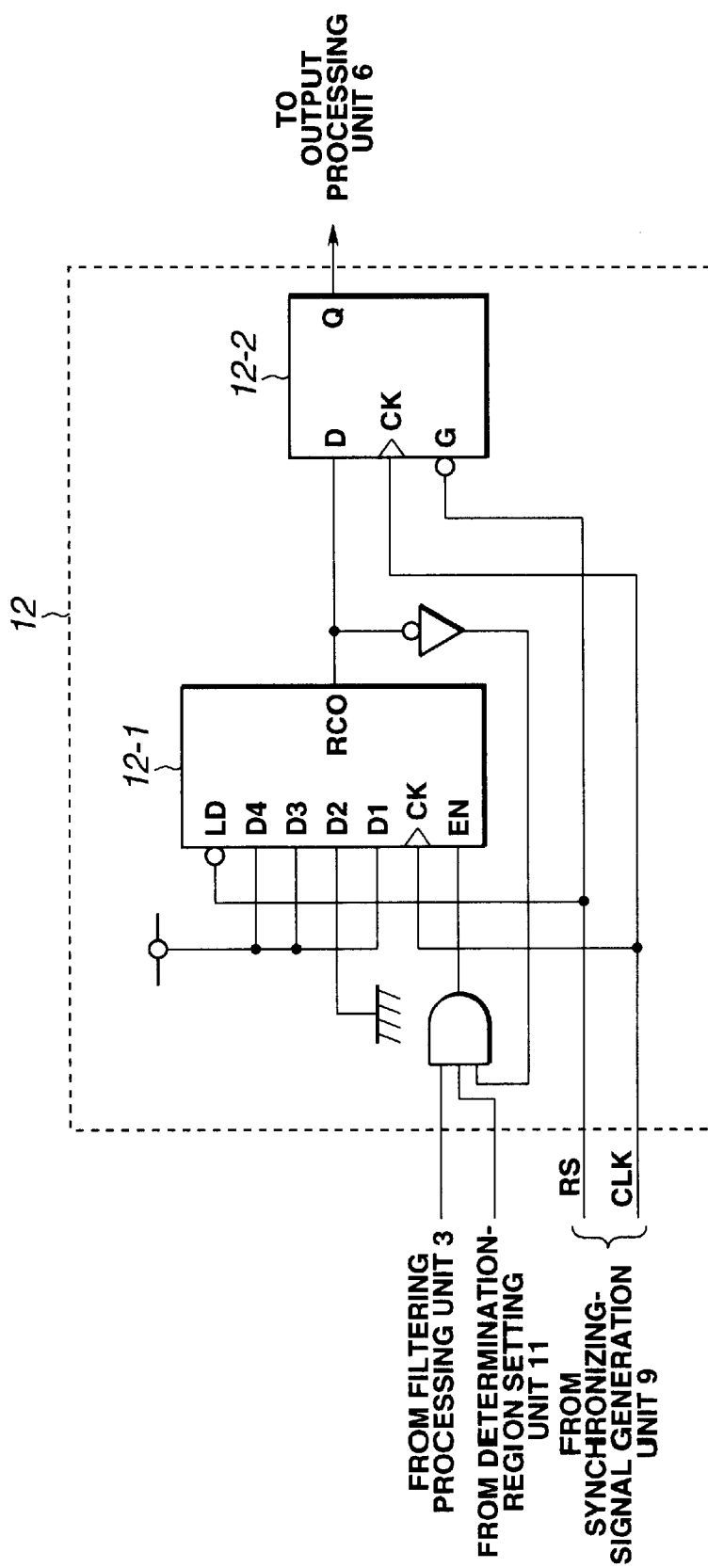
FIG. 17 is a block diagram illustrating the configuration of circuitry of a control-signal generation unit shown in FIG. 13.
Figure 18:
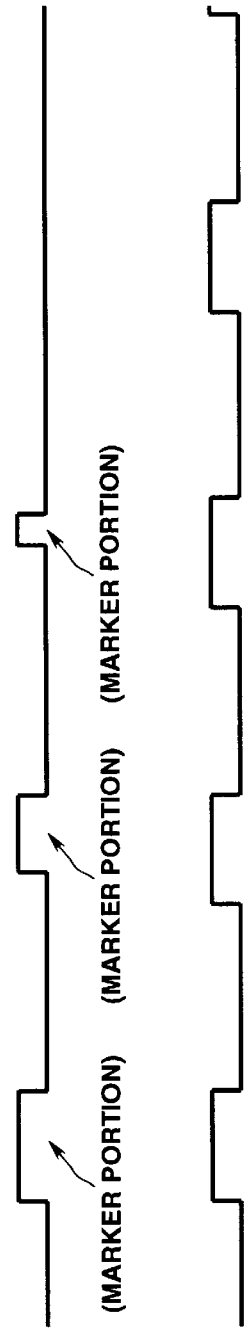
FIGS. 18(1) through 18(6) are timing charts illustrating operation of the control-signal generation unit.

FIG. 17 is a block diagram illustrating the circuitry of the control-signal generation unit 12. In the circuitry shown in FIG. 17, when the number of pixels determined to belong to portions of a marker reaches a certain value, a control signal for the next line is output. In FIG. 17, a counter 12-1 performs a counting operation in synchronization with the rise of a clock signal when an input to a terminal EN assumes 1. When an input to the terminal EN assumes 0, an initial value is loaded in synchronization with the rise of the clock signal. According to the interconnection of terminals D1–D4, the counter 12-1 outputs 1 from its terminal RCO when the count value exceeds 3. Although FIG. 17 illustrates a hexadecimal counter, the present embodiment is not limited to such a counter. A D flip-flop circuit 12-2 outputs the value input to a terminal D to a Q output terminal in synchronization with the rise of the clock signal when an input to a terminal G assumes 0. The operations of the control-signal generation unit 12 will now be described with reference to FIGS. 18(1) through 18(6). In FIGS. 18(1)–18(6), a control signal is generated when at least ten pixels on one line and at least three pixels in the result of filtering processing assume 1. FIG. 18(1) illustrates an image clock signal. FIG. 18(2) illustrates a line synchronizing signal. FIG. 18(3) illustrates the output of the filter processing unit 3. FIG. 18(4) illustrates the output of the determination-region setting unit 11. FIG. 18(5) illustrates the RCO output of the counter 12-1. FIG. 18(6) illustrates the Q output of the flip-flop circuit 122. If a marker portion is present on the N-th line, the output of the filtering processing unit 3 shown in FIG. 18(3) becomes 1. The counter 12-1 performs a counting operation in synchronization with the image clock signal CLK while the counted pixel is within the determination region and the result of filtering processing shown in FIG. 18(3) assumes 1. When the counted pixel is within the determination region and the result of filtering processing is equal to or greater than a set value, the RCO signal of the counter 12-1 shown in FIG. 18(5) becomes 1. A counting operation is not performed thereafter until the end of the line, and that state is held. When the line synchronizing signal RS shown in FIG. 18(2) assumes 0, the output of the D flip-flop circuit 12-2 shown in FIG. 18(6) becomes 1 at the rise of the image clock signal CLK. This output continues during processing for the (N+1)-th line. An initial value is loaded in the counter 12-1. When outputting a control signal not for the next line but for the current line, the logical sum of the output of the D flip-flop circuit 12-2 and the RCO output of the counter 12-1 may be output as the control signal. The same operation is repeated while the original is read.

Figure 25:
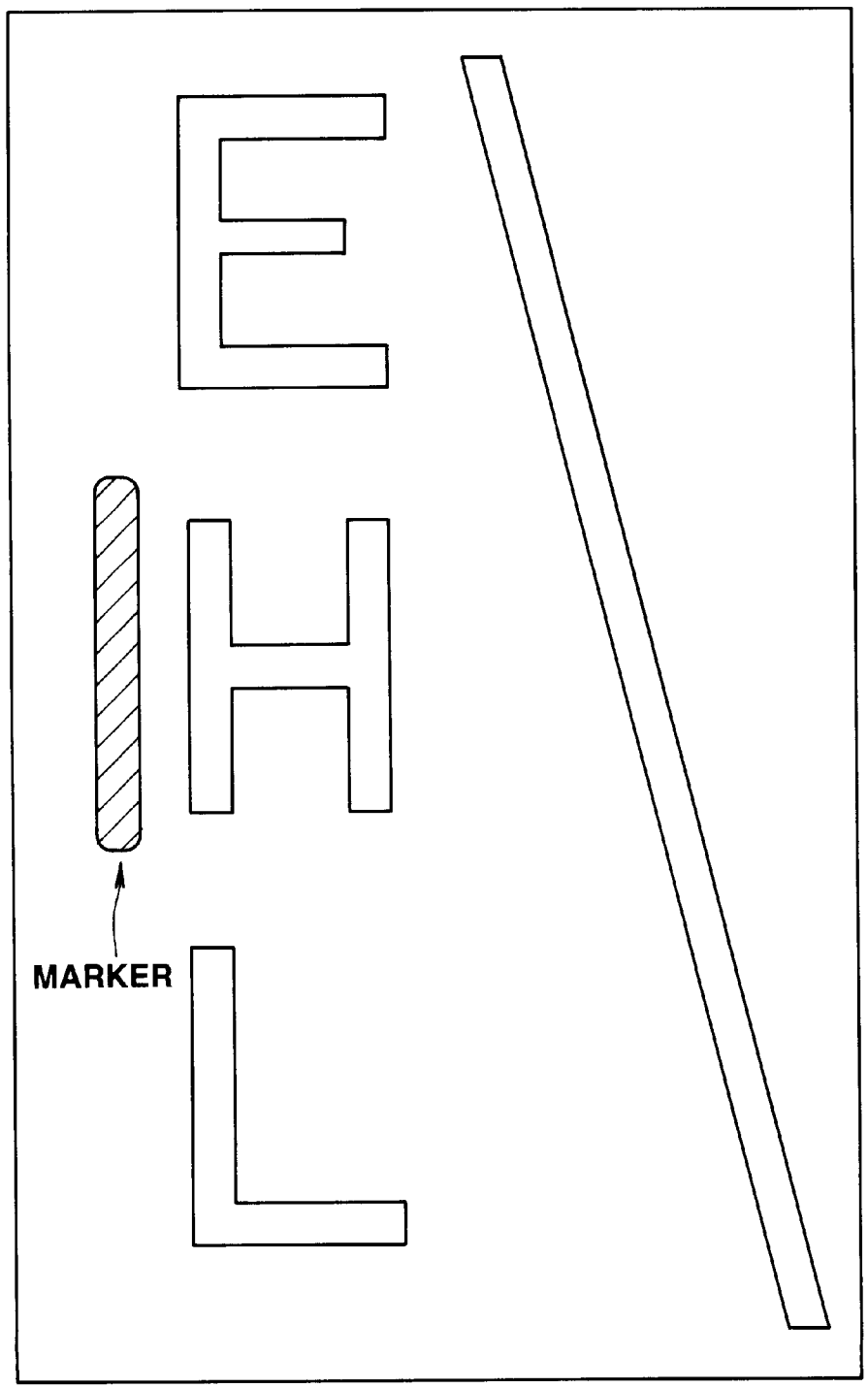
FIG. 25 is a diagram illustrating an image before processing in the third embodiment.
Figure 26:
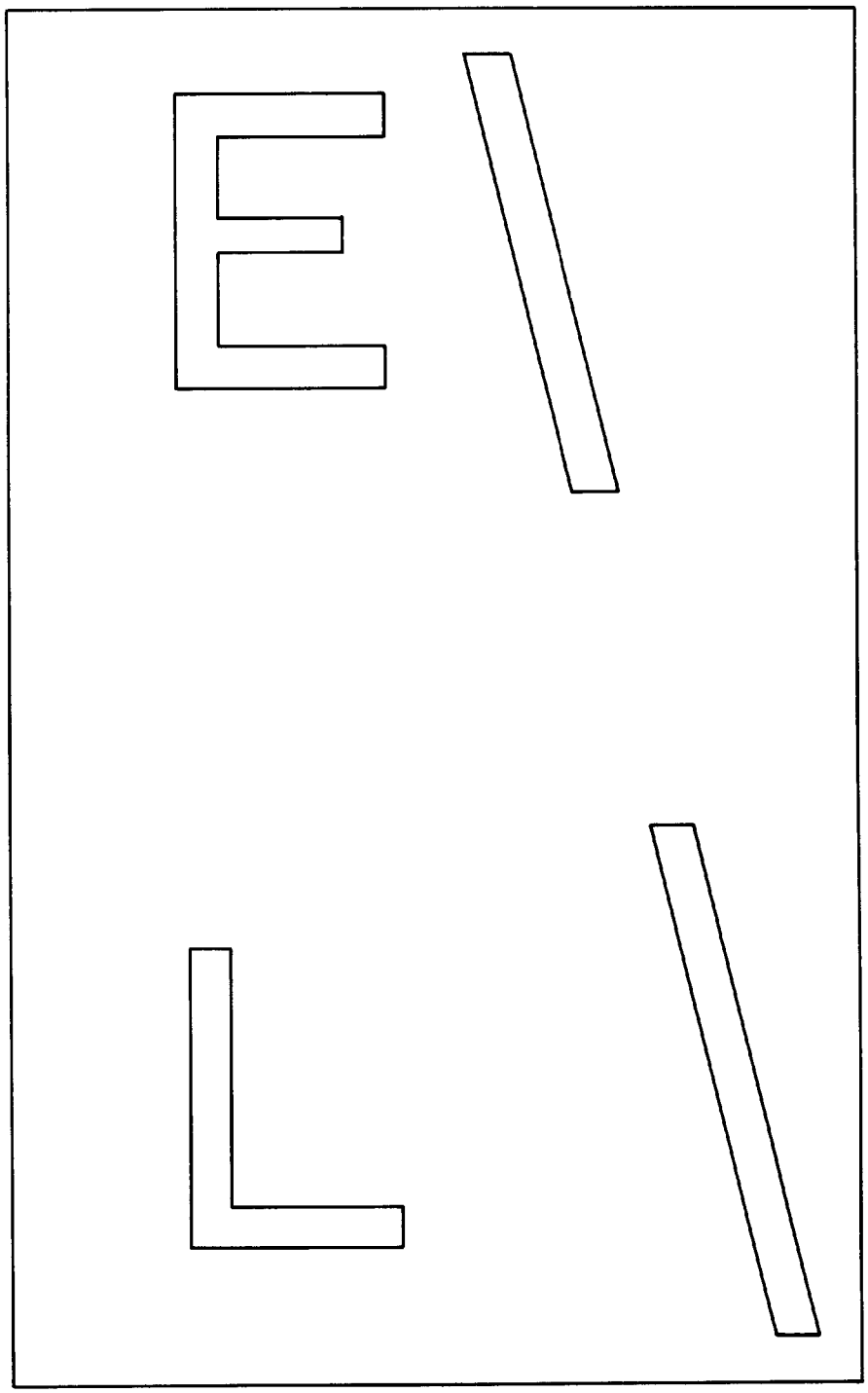
FIG. 26 is a diagram illustrating an image after processing in the third embodiment.

Next, a description will be provided of those portions of the operations of the second embodiment which are different from the first embodiment. The control-signal generation unit 12 generates a control signal according to the above-described operation in accordance with the output of the filtering processing unit 3. The output processing unit 6 outputs white-pixel data and the result of the binary-coding processing unit 4 when the output of the control-signal generation unit 12 assumes 1 and 0, respectively, from the D flip-flop circuit 6-3 in synchronization with the image clock signal. That is, if the image representation of the original shown in FIG. 25 is processed, white pixels are output for lines having the marker, and images subjected to binary-coding processing are output for other portions, as shown in FIG. 26.

As described above, since a recording operation is performed in synchronization with an original-reading operation and an editing operation for an original, an image representation can be edited and output in real time.

When the speed differs between the reading unit and the recording unit, the same configuration as that described in the first embodiment may be adopted.

An image may also be transmitted via a communication unit. In this case also, since a reading operation, an editing operation and a transmission operation can be simultaneously performed, a simple configuration can be realized in which, for example, a page image memory is unnecessary.

Fourth Embodiment

Figure 19:
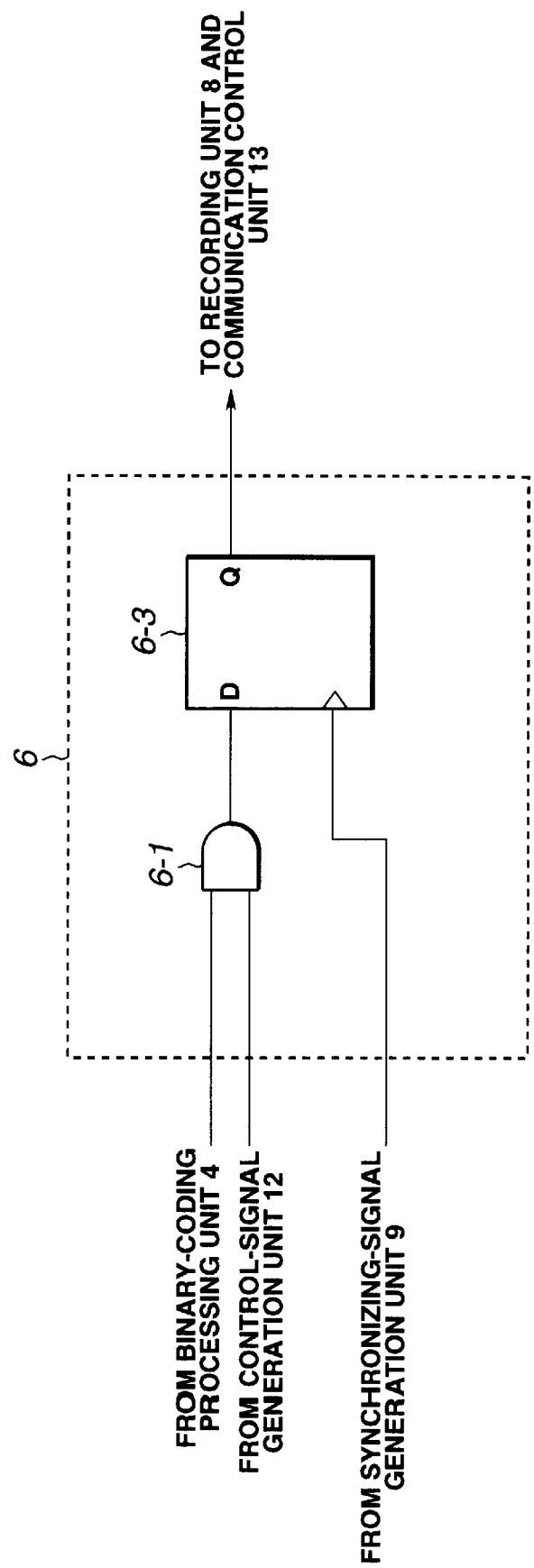
FIG. 19 is a block diagram illustrating the configuration of circuitry of an output processing unit according to a fourth embodiment of the present invention.

FIG. 19 illustrates an example of the configuration of the output processing unit 6 according to a fourth embodiment of the present invention. A description will now be provided of only those portions which are different from the first and third embodiments.

Figure 27:
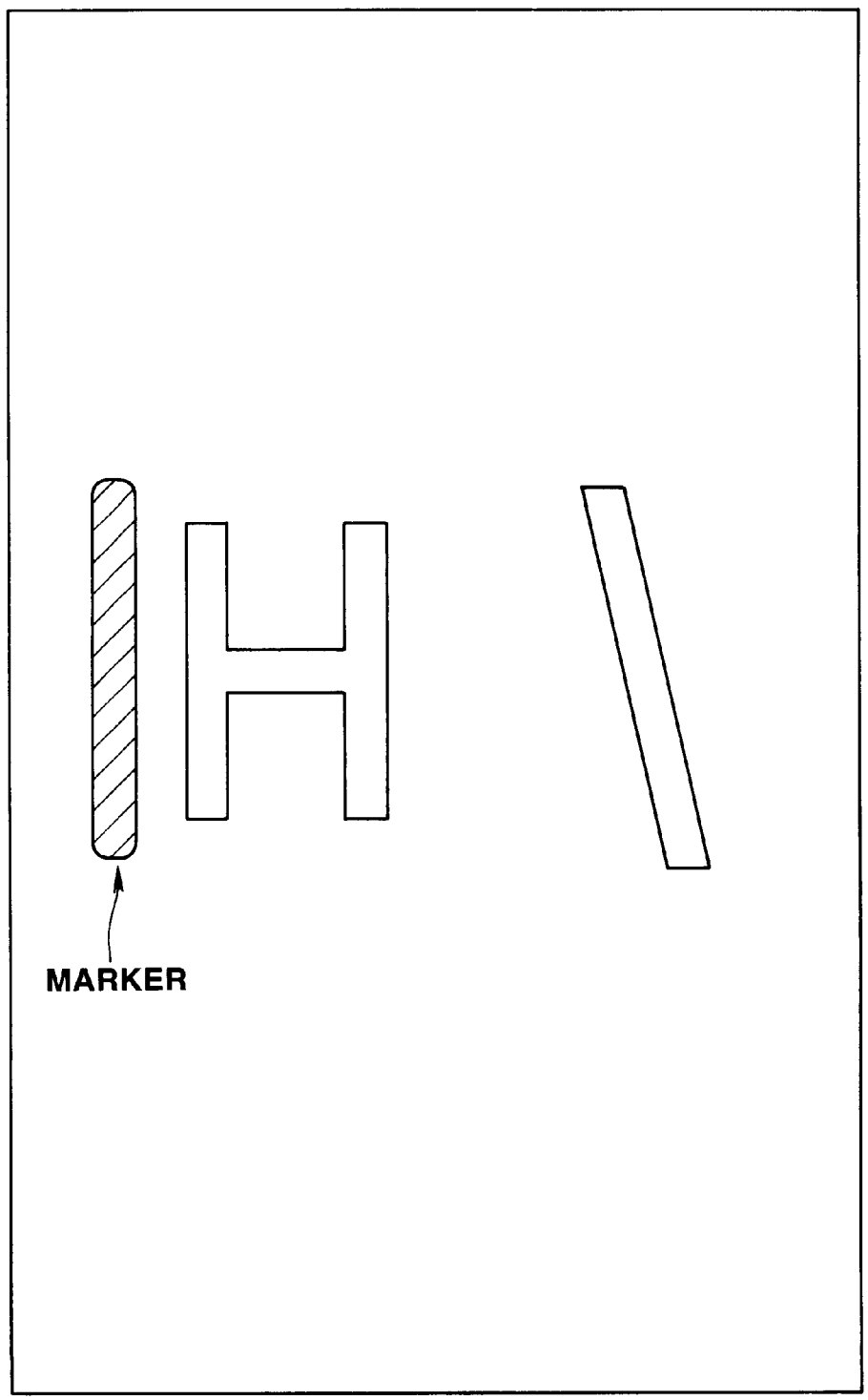
FIG. 27 is a diagram illustrating an image after processing in the fourth embodiment.

The control-signal generation unit 12 generates a control signal according to the above-described operation in accordance with the output of the filtering processing unit 3. The output processing unit 6 outputs white-pixel data and the result of processing of the binary-coding processing unit 4 when the output of the control-signal generation unit 12 assumes 0 and 1, respectively, from the D flip-flop circuit 6-3 in synchronization with an image clock signal. That is, if the image representation of the original shown in FIG. 25 is processed, images subjected to binary-coding processing are output for lines having the marker, and white pixels are output for other portions, as shown in FIG. 27.

As described above, since a recording operation is performed in synchronization with an original-reading operation and an editing operation, an image representation can be edited and output in real time.

When the speed differs between the reading unit and the recording unit, the same configuration as that described in the first embodiment may be adopted.

An image may also be transmitted via a communication unit. In this case also, since an original-reading operation, an editing operation and a transmission operation can be simultaneously performed, a simple configuration can be realized in which, for example, a page image memory is unnecessary.

Fifth Embodiment

Figure 20:
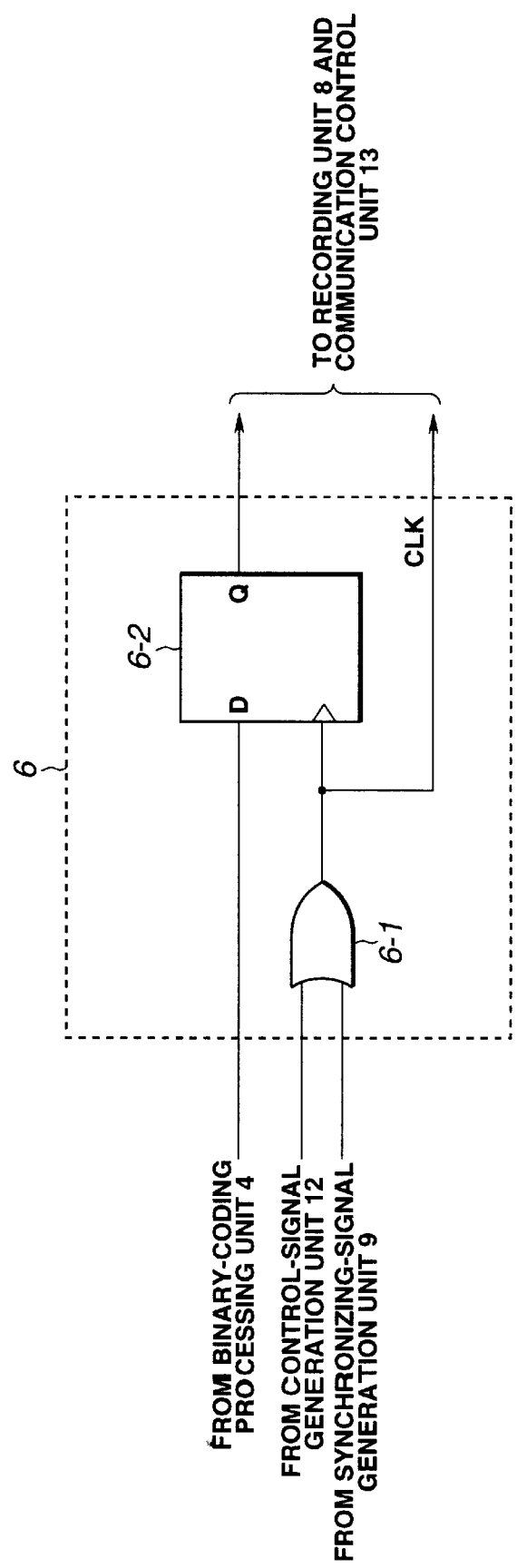
FIG. 20 is a block diagram illustrating the configuration of circuitry of an output processing unit according to a fifth embodiment of the present invention.
Figure 28:
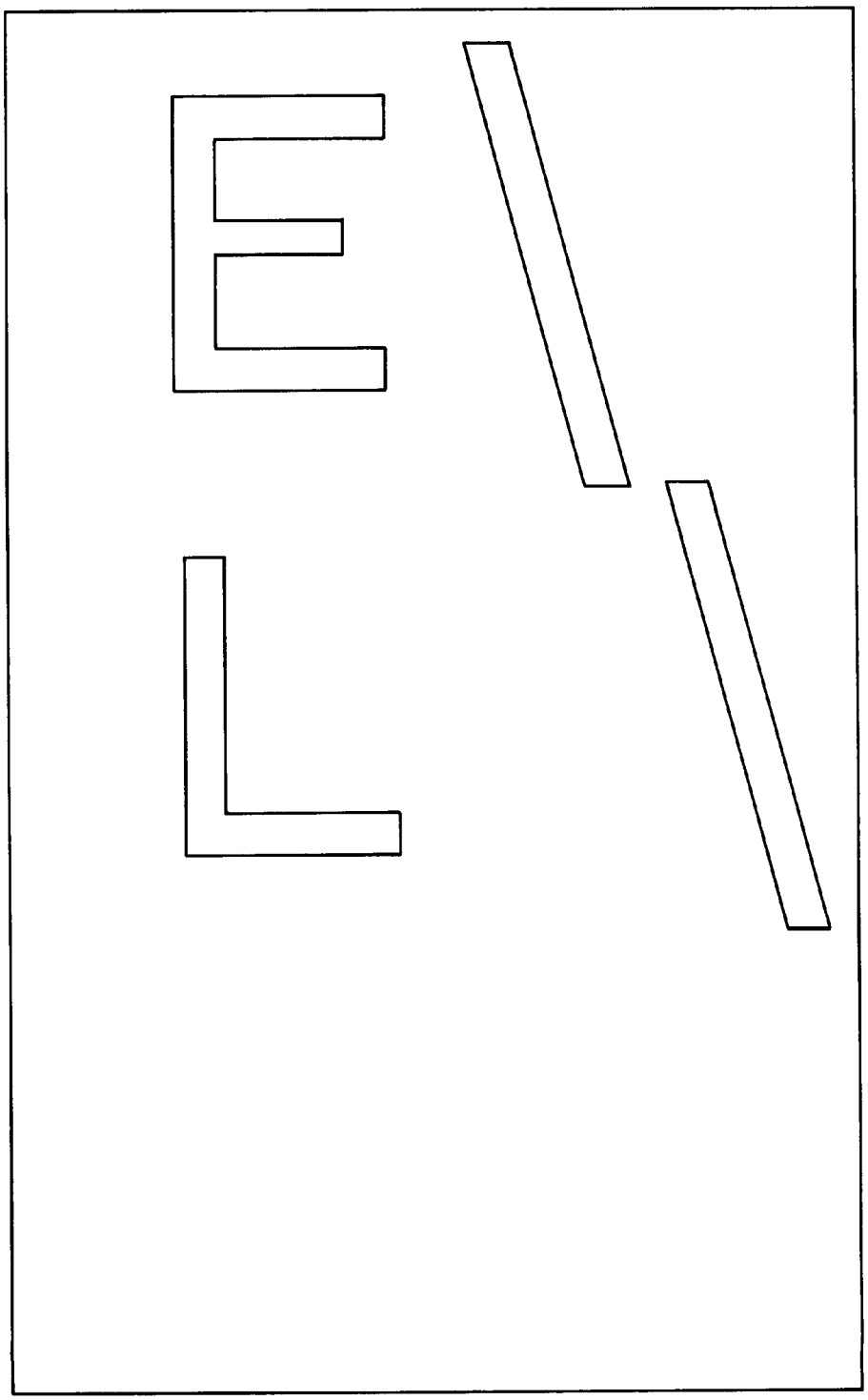
FIG. 28 is a diagram illustrating an image after processing in the fifth embodiment.

FIG. 20 is a block diagram illustrating an example of the configuration of the output processing unit 6 according to a fifth embodiment of the present invention. In FIG. 20, reference numeral 6-1 represents an OR gate, and reference numeral 6-2 represents a D flip-flop circuit. A description will now be provided of only those portions that are different from the third embodiment. The control-signal generation unit 12 generates a control signal according to the above-described operation in accordance with the output of the filtering processing unit 3. When the output of the control-signal generation unit 12 assumes 1, i.e., when the number of pixels determined to constitute a marker is equal to or greater than a set value, a line-deletion signal is output from a D flip-flop circuit 6-3 in synchronization with a line synchronizing signal. When the line-deletion signal is output, the image clock signal is stopped, so that an image is not output for one line. That is, if the image of the original shown in FIG. 25 is processed, lines having the marker are deleted, and images subjected to binary-coding processing are output for other portions, as shown in FIG. 28. When simultaneously performing an original-reading operation, an editing operation and a recording operation, the recording operation may be interrupted for lines for which the image clock signal is stopped. If the recording unit cannot interrupt a recording operation, the result of an original-reading operation and an editing operation may be first stored in a memory, and data stored in the memory may be recorded in synchronization with a recording operation. In this case, the used capacity of the image memory can be reduced by the amount of deleted lines.

Sixth Embodiment

Figure 21:
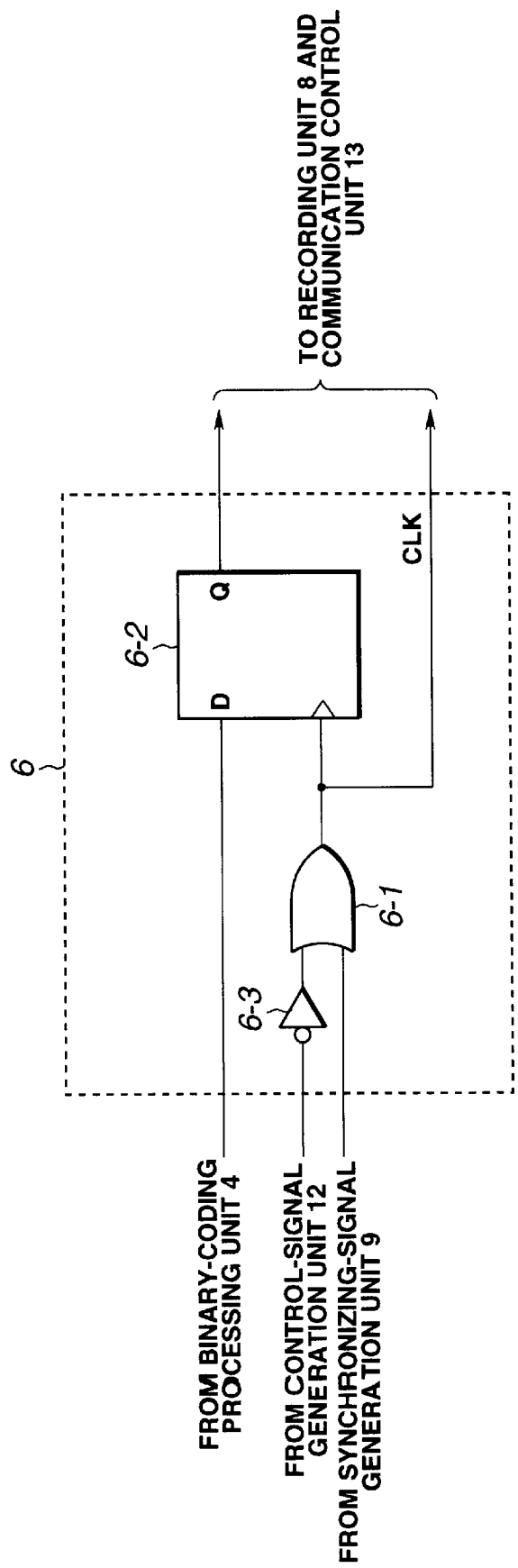
FIG. 21 is a block diagram illustrating the configuration of circuitry of an output processing unit according to a sixth embodiment of the present invention.
Figure 29:
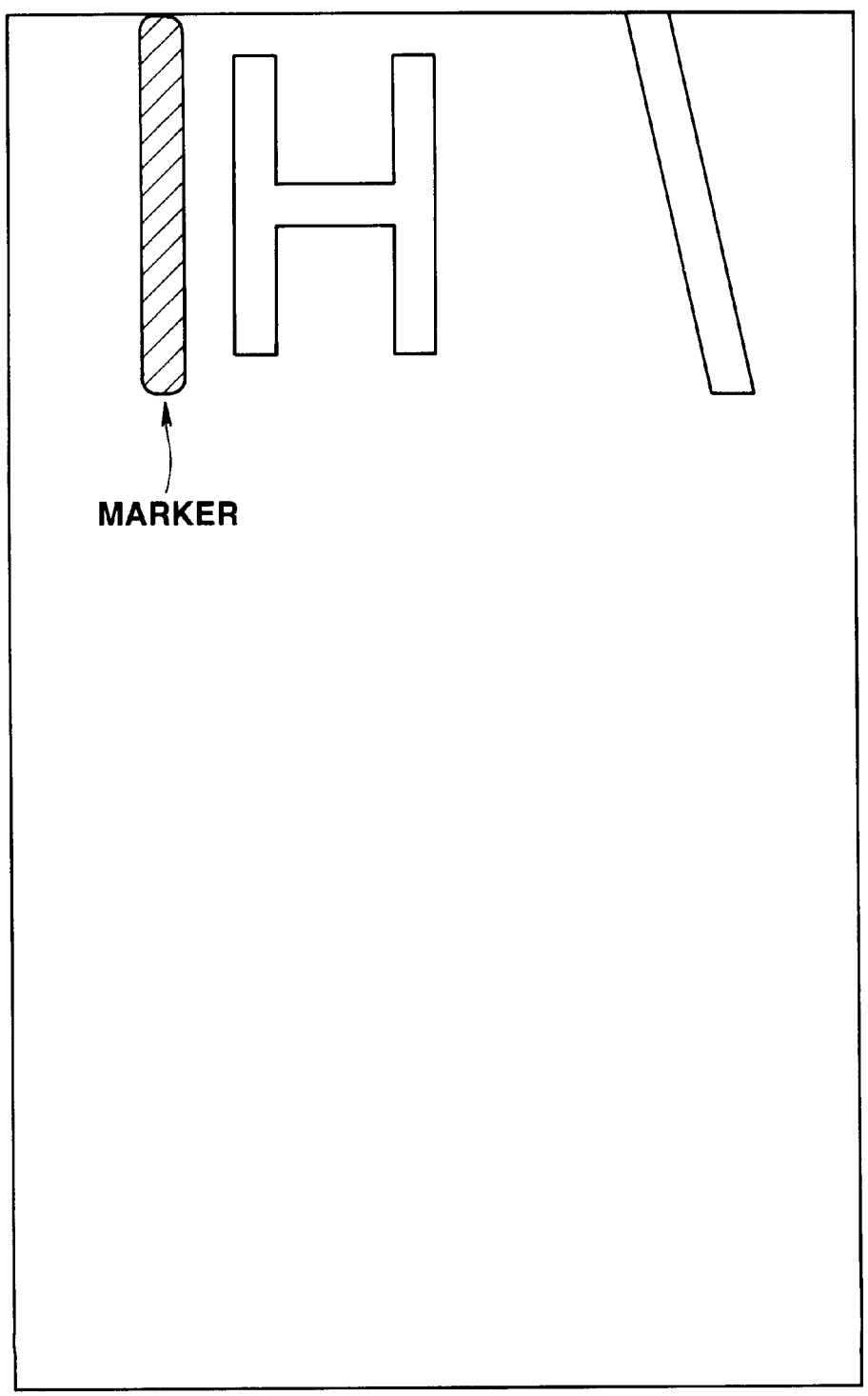
FIG. 29 is a diagram illustrating an image after processing in the sixth embodiment.

FIG. 21 is a block diagram illustrating an example of the configuration of the output processing unit 6 according to a sixth embodiment of the present invention. In FIG. 21, reference numeral 6-1 represents an OR gate, reference numeral 6-2 represents a D flip-flop circuit, and reference numeral 6-3 represents an inverter. A description will now be provided of only those portions that are different from the fourth embodiment. The control-signal generation unit 12 generates a control signal according to the above-described operation in accordance with the output of the filtering processing unit 3. When the output of the control-signal generation unit 12 assumes 0, i.e., when the number of pixels determined to constitute a marker is equal to or less than a set value, a line-deletion signal is output from the D flip-flop circuit 6-3 in synchronization with a line synchronizing signal. When the line-deletion signal is output, the image clock signal is stopped, so that an image is not output for one line. That is, if the image of the original shown in FIG. 25 is processed, an image subjected to binary-coding processing is output for lines having the marker, and images are deleted for other portions, as shown in FIG. 29. When simultaneously performing an original-reading operation, an editing operation and a recording operation, the recording operation may be interrupted for lines for which the image clock signal is stopped. If the recording unit cannot interrupt a recording operation, the result of an original-reading operation and an editing operation may be first stored in a memory, and data stored in the memory may be recorded in synchronization with a recording operation. In this case, the used capacity of the image memory can be reduced by the amount of deleted lines.

In all of the above-described embodiments, a brightness determination unit may be used instead of the density determination unit 2.

The individual components designated by blocks in the drawings are all well known in the facsimile apparatus art and their specific construction and operation are not critical to the operation or the best mode for carrying out the invention.

While the present invention has been described with respect to what is presently considered to be the preferred embodiments, it is to be understood that the invention is not limited to the disclosed embodiments. To the contrary, the present invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An image processing apparatus comprising:
   reading means for reading an original having at least one information element thereon to provide a first image representation including at least one image;
   discrimination means for discriminating, for an image in the first image representation, whether the image has a predetermined color other than a black color or does not have the predetermined color;
   conversion means which, in a first mode of said apparatus, converts the predetermined color into the black color and converts a portion that does not have the predetermined color into a predetermined repeating pattern to provide a first converted image representation, and, in a second mode of said apparatus, converts the predetermined color into a predetermined repeating pattern to provide a second converted image representation and subjects other portions to binary-coding processing.

2. An apparatus according to claim 1, wherein, for each image in the first image representation, said reading means outputs data corresponding to a density of the image and said discrimination means discriminates whether the image is a color image based on the density of the image.

3. An apparatus according to claim 2, wherein said discrimination means discriminates that an image is a color image when a value of the density of the image is between a lower threshold value and an upper threshold value.

4. An apparatus according to claim 2, wherein said discrimination means includes filter means for performing filter processing on the data corresponding to the density to provide filtered data, said discrimination means discriminating whether each image is a color image or a non-color image based on the filtered data.

5. An apparatus according to claim 1, wherein the repeating pattern is a pattern that looks gray.

6. An apparatus according to claim 1, wherein said discrimination means discriminates an image corresponding to a red information element on an examination paper as a color image and discriminates an image corresponding to a black information element on the examination paper as a non-color image.

7. An apparatus according to claim 1, wherein said conversion means provides a converted image representation as identical to the first image representation except that the predetermined color in the first image representation is replaced by the black color and the portion that does not have the predetermined color in the first image representation is replaced by the predetermined repeating pattern.

8. An apparatus according to claim 1, wherein said conversion means provides a converted image representation as including fewer than all the black color and the predetermined repeating pattern portions converted from the predetermined color portion and the portion that does not have the predetermined color, respectively, in the first image representation.

9. An apparatus according to claim 1, wherein said conversion means provides a converted image representation with at least one of the black color and the predetermined repeating pattern portions disposed at a different position from that of the respective predetermined color portion or the portion that does not have the predetermined color in the first image representation.

10. An apparatus according to claim 1, further comprising transmission means for performing facsimile transmission of the first converted image representation in the first mode and for performing facsimile transmission of the second converted image representation in the second mode.

11. An image processing method comprising the steps of:
    reading an original having at least one information element thereon to provide a first image representation including at least one image;
    discriminating, for an image in the first image representation, whether the image has a predetermined color other than a black color or does not have the predetermined color;
    in a first mode of said method, converting the predetermined color portion into the black color and converting a portion that does not have the predetermined color into a predetermined repeating pattern to provide a first converted image representation, and, in a second mode of said method, converting the predetermined color into a predetermined repeating pattern to provide a second converted image representation and subjecting other portions to binary-coding processing.

12. A method according to claim 11, wherein, for each image in the first image representation, said reading step outputs data corresponding to a density of the image and said discrimination step discriminates whether the image is a color image based on the density of the image.

13. A method according to claim 12, wherein said discrimination step discriminates that an image is a color image when a value of the density of the image is between a lower threshold value and an upper threshold value.

14. A method according to claim 11, wherein the repeating pattern is a pattern that looks gray.

15. A method according to claim 12, wherein said discrimination step includes a filter step of performing filter processing on the data corresponding to the density to provide filtered data, said discrimination step discriminating whether each image is a color image or a non-color image based on the filtered data.

16. A method according to claim 11, wherein said discrimination step discriminates an image corresponding to a red information element on an examination paper as a color image and discriminates an image corresponding to a black information element on the examination paper as a non-color image.

17. A method according to claim 11, wherein said conversion means provides a converted image representation as identical to the first image representation except that the predetermined color in the first image representation is replaced by the black color and the portion that does not have the predetermined color in the first image representation is replaced by the the predetermined repeating pattern.

18. A method according to claim 11, wherein said conversion step provides a converted image representation as including fewer than all the black color and the predetermined repeating pattern portions converted from the predetermined color portion and the portion that does not have the predetermined color, respectively, in the first image representation.

19. A method according to claim 11, wherein said conversion step provides a converted image representation with at least one of the black color and the predetermined repeating pattern portions disposed at a different respective position from that of the predetermined color portion or the portion that does not have the predetermined color in the first image representation.

20. A method according to claim 11, further comprising a transmission step of performing facsimile transmission of the first converted image representation in the first mode and of performing facsimile transmission of the second converted image representation in the second mode.

21. An image processing apparatus comprising:
reading means for reading an original having at least one information element thereon to provide a first image representation including at least one image;
discrimination means for discriminating, for an image in the first image representation, whether the image has a specific color other than a black color, corresponding to a first-type image, or a portion that does not have the specific color, corresponding to the second-type image;
conversion means which, in a first mode of said apparatus, converts the specific color of the first-type image into the black color and converts the portion that does not have the specific color of the second-type image into a predetermined repeating pattern to provide a first converted image representation, and, in a second mode of said apparatus, converts the specific color into a predetermined repeating pattern to provide a second converted image representation and subjects other portions to binary-coding processing.

22. An apparatus according to claim 21, wherein, for each image in the first image representation, said reading means outputs data corresponding to a density of the image and said discrimination means discriminates whether the image is a first-type image based on the density of the image.

23. An apparatus according to claim 22, wherein said discrimination means discriminates that an image is the first-type image when a value of the density of the image is between a lower threshold value and an upper threshold value.

24. An apparatus according to claim 22, wherein said discrimination means includes filter means for performing filter processing on the data corresponding to the density to provide filtered data, said discrimination means discriminating whether each image is the first-type image or the second-type image based on the filtered data.

25. An apparatus according to claim 21, wherein the repeating pattern is a pattern that looks gray.

26. An apparatus according to claim 21, wherein said discrimination means discriminates an image corresponding to a red information element on an examination paper as the first-type image and discriminates an image corresponding to a black information element on the examination paper as the second-type image.

27. An apparatus according to claim 21, wherein said conversion means provides a converted image representation as identical to the first image representation except that the specific color of the first-type image in the first image representation is replaced by the black color and the portion that does not have the specific color of the second-type image in the first image representation is replaced by the predetermined repeating pattern.

28. An apparatus according to claim 21, wherein said conversion means provides a converted image representation as including fewer than all the black color and the predetermined repeating pattern portions converted from the first-type and second-type images, respectively, in the first image representation.

29. An apparatus according to claim 21, wherein said conversion means provides a converted image representation with at least one of the black color and the predetermined repeating pattern portions disposed at a different respective position from that of the first-type or second-type image in the first image representation.

30. An apparatus according to claim 21, further comprising transmission means for performing facsimile transmission of the first converted image representation in the first mode and for performing facsimile transmission of the second converted image representation in the second mode.

31. An image processing method comprising the steps of:
reading an original having at least one information element thereon to provide a first image representation including at least one image;
discriminating, for an image in the first image representation, whether the image has a specific color other than a black color, corresponding to a first-type image, or a portion that does not have the specific color, corresponding to the second-type image;
in a first mode of said method, converting the specific color into the black color and converting the portion that does not have the specific color into a predetermined repeating pattern to provide a first converted image representation, and, in a second mode of said method, converting the specific color into a predetermined repeating pattern to provide a second converted image representation and subjecting other portions to binary-coding processing.

32. A method according to claim 31, wherein, for each image in the first image representation, said reading step outputs data corresponding to a density of the image and said discrimination step discriminates whether the image is a first-type image based on the density of the image.

33. A method according to claim 32, wherein said discrimination step discriminates that an image is the first-type image when a value of the density of the image is between a lower threshold value and an upper threshold value.

34. A method according to claim 32, wherein said discrimination step includes a filter step of performing filter processing on the data corresponding to the density to provide filtered data, said discrimination step discriminating whether each image is the first-type image or the second-type image based on the filtered data.

35. A method according to claim 31, wherein the repeating pattern is a pattern that looks gray.

36. A method according to claim 31, wherein said discrimination step discriminates an image corresponding to a red information element on an examination paper as the first-type image and discriminates an image corresponding to a black information element on the examination paper as the second-type image.

37. A method according to claim 31, wherein said conversion step provides a converted image representation as identical to the first image representation except that the specific color of the first-type image in the first image representation is replaced by the black color and the portion that does not have the specific color of the second-type image in the first image representation is replaced by the predetermined repeating pattern.

38. A method according to claim 31, wherein said conversion step provides a converted image representation as including fewer than all the black color and the predetermined repeating pattern portions converted from the first-type and second-type images, respectively, in the first image representation.

39. A method according to claim 31, wherein said conversion step provides a converted image representation with at least one of the black color and the predetermined repeating pattern portions disposed at a different respective position from that of the first-type or second-type image in the first image representation.

40. A method according to claim 31, further comprising a transmission step of performing facsimile transmission of the first converted image representation in the first mode and of performing facsimile transmission of the second converted image representation in the second mode.

41. An image processing apparatus comprising:

reading means for reading an original having at least one information element thereon to provide a first image representation including at least one image having a density, said reading means outputting density data corresponding to a density of an image;

discrimination means for discriminating, for an image in the first image representation and based on the density data for the image, whether the image has a density in a predetermined range, corresponding to a first-type portion, or has a density outside of the predetermined range, corresponding to a second-type portion;

conversion means which, in a first mode of said apparatus, converts the first-type portion into a black portion and converts the second-type portion into a predetermined repeating pattern portion to provide a first converted image representation, and in a second mode of said apparatus, converts the second-type portion into a black portion and converts the first-type portion into a predetermined repeating pattern portion to provide a second converted image representation.

42. An apparatus according to claim 41, wherein, for each image in the first image representation, said reading means outputs data corresponding to a density of that image and said discrimination means discriminates whether that image is a first-type image based on the density of that image.

43. An apparatus according to claim 42, wherein said discrimination means includes filter means for performing filter processing on the data corresponding to the density to provide filtered data, said discrimination means discriminating whether each image is the first-type image or the second-type image based on the filtered data.

44. An apparatus according to claim 41, further comprising transmission means for performing facsimile transmission of the first converted image representation in the first mode and for performing facsimile transmission of the second converted image representation in the second mode.

* * * * *

UNITED STATES PATENT AND TRADEMARK OFFICE
CERTIFICATE OF CORRECTION

PATENT NO. : 6,061,470

DATED : May 9, 2000

INVENTOR(S) : TAKAHIRO KIYOHARA

It is certified that error appears in the above-identified patent and that said Letters Patent is hereby corrected as shown below:

COLUMN 1

Line 66, "meand" should read --means--.

COLUMN 3

Line 66, "lead ing" should read --leading--.

COLUMN 5

Line 64, "flip-clop" should read --flip-flop--.

COLUMN 11

Line 17, "color;" should read --color; and--.

COLUMN 12

Line 16, "color;" should read --color; and--.

COLUMN 13

Line 16, "image;" should read --image; and--.

UNITED STATES PATENT AND TRADEMARK OFFICE
CERTIFICATE OF CORRECTION

PATENT NO. : 6,061,470

DATED : May 9, 2000

INVENTOR(S) : TAKAHIRO KIYOHARA

It is certified that error appears in the above-identified patent and that said Letters Patent is hereby corrected as shown below:

COLUMN 14

Line 17, "image;" should read --image; and--.

COLUMN 15

Line 19, "portion;" should read --portion; and--.

Signed and Sealed this

Third Day of April, 2001

*Attest:*

NICHOLAS P. GODICI

*Attesting Officer*    *Acting Director of the United States Patent and Trademark Office*